(12) United States Patent
Van Belleghem et al.

(10) Patent No.: US 12,544,488 B2
(45) Date of Patent: Feb. 10, 2026

(54) 3D PRINTED SCAFFOLD STRUCTURES AND METHODS OF FABRICATION

(71) Applicant: University of Maryland, College Park, College Park, MD (US)

(72) Inventors: Sarah Van Belleghem, Washington, DC (US); John Patrick Fisher, Kensington, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 18/391,766

(22) Filed: Dec. 21, 2023

(65) Prior Publication Data

US 2024/0245828 A1  Jul. 25, 2024

Related U.S. Application Data

(63) Continuation of application No. 16/846,583, filed on Apr. 13, 2020, now abandoned.
(Continued)

(51) Int. Cl.
*A61L 27/26* (2006.01)
*A61L 27/36* (2006.01)
(Continued)

(52) U.S. Cl.
CPC ........... *A61L 27/26* (2013.01); *A61L 27/3641* (2013.01); *A61L 27/3813* (2013.01); *A61L 27/52* (2013.01); *A61L 27/54* (2013.01); *A61L 27/58* (2013.01); *B33Y 10/00* (2014.12); *B33Y 70/00* (2014.12); *B33Y 80/00* (2014.12); *A61L 2300/406* (2013.01); *A61L 2300/41* (2013.01);
(Continued)

(58) Field of Classification Search
CPC .......... A61L 2300/406; A61L 2300/41; A61L 2300/414; A61L 2430/04; A61L 2430/34; A61L 27/26; A61L 27/3641; A61L 27/3413; A61L 27/52; A61L 27/54; A61L 27/58; A61L 27/60; B29K 2105/0061; B29K 2995/0056; B29L 2031/7532; B33Y 10/00; B33Y 70/00; B33Y 70/10; B33Y 80/00
See application file for complete search history.

(56) References Cited

U.S. PATENT DOCUMENTS 5,580,781 A    12/1996  Naughton et al.
2003/0175410 A1  9/2003  Campbell et al.
(Continued)

FOREIGN PATENT DOCUMENTS

WO         9308776 A1    5/1993
WO    WO-2015002707 A1 *  1/2015 ............. A61L 27/52

OTHER PUBLICATIONS

Jia et al. (Biomaterials 2016;106:58-68) (Year: 2016).*
(Continued)

*Primary Examiner* — Ernst V Arnold
(74) *Attorney, Agent, or Firm* — HYLTON-RODIC LAW PLLC

(57) ABSTRACT

An implantable scaffold device comprises a non-biodegradable backbone and a biodegradable dermal compartment comprising live cells. Method of fabricating implantable devices via 3D printing using a synthetic ink formulation coprinted with a biodegradable bioink.

20 Claims, 23 Drawing Sheets
(6 of 23 Drawing Sheet(s) Filed in Color)

Related U.S. Application Data

(60) Provisional application No. 62/832,352, filed on Apr. 11, 2019.

(51) Int. Cl.
| | |
|---|---|
| A61L 27/38 | (2006.01) |
| A61L 27/52 | (2006.01) |
| A61L 27/54 | (2006.01) |
| A61L 27/58 | (2006.01) |
| A61L 27/60 | (2006.01) |
| B33Y 10/00 | (2015.01) |
| B33Y 70/00 | (2020.01) |
| B33Y 70/10 | (2020.01) |
| B33Y 80/00 | (2015.01) |
| B29C 64/112 | (2017.01) |
| B29K 105/00 | (2006.01) |
| B29L 31/00 | (2006.01) |

(52) U.S. Cl.
CPC ..... *A61L 2300/414* (2013.01); *A61L 2430/34* (2013.01); *B29C 64/112* (2017.08); *B29K 2105/0061* (2013.01); *B29K 2995/0056* (2013.01); *B29L 2031/7532* (2013.01)

(56) References Cited

U.S. PATENT DOCUMENTS

| | | | |
|---|---|---|---|
| 2011/0117167 | A1 | 5/2011 | Sanford et al. |
| 2013/0189342 | A1 | 7/2013 | Patel et al. |
| 2015/0351896 | A1* | 12/2015 | D'Lima ............. A61F 2/062 604/522 |
| 2017/0189581 | A1 | 7/2017 | Desai et al. |
| 2018/0015204 | A1 | 1/2018 | Pashos et al. |

OTHER PUBLICATIONS

Chae et al. (3D Bioprinting in Nipple-Areola Complex Reconstruction First Online: Aug. 22, 2017; pp. 587-606) (Year: 2017).*
Guo et al. (Tissue Engineering: Part B; 2017; 23(3):225-236) (Year: 2017).*
Xia et al. (SLAS Technology 2018;23(4):301-314) (Year: 2018).*
Wajtowicz et al. (Wound Rep Reg (2014) 22 246-255). (Year: 2014).*
Mansbridge, "Dermagraft—human fibroblast-derived dermal substitute," J Anatomy, 209(4), 571, 2006.
Monfort, et al., "Strategies for Human Adipose Tissue Repair and Regeneration," J Cosmet, Dermatol Sci. Appl., 2, 93-107, 2012.
Okabe et al., Injectable soft-tissue augmentation by tissue engineering and regenerative medicine with human mesenchymal stromal cells, platelet-rich plasma and hyaluronic acid scaffolds, Cytotherapy, 11(3): 307-316, 2009.
Ong, et al., "Preclinical Evaluation of Tegaderm™ Supported Nanofibrous Wound Matrix Dres+G32:G33sing on Procine Wound Healing Model," Advances in Wound Care, 4(2), 110-118, 2015.
Park, et al., "The application of an acellular dermal allograft (AlloDerm) for patients with insufficient conjuctiva during evisceration and implantation surgery," Eye, 32(1), 136-141, 2018.
Pati, et al., "Biomimetic 3D tissue printing for soft tissue regeneration," Biomaterials, 62, 164-175, 2015.
Petta, et al., "3D bioprinting of a hyaluronan bioink through enzymatic-and visible light-crosslinking," Biofabrication, 10(4), 044104, 2018.
Pourchet, et al., "Human Skin 3D Bioprinting Using Scaffold-Free Approach," Advanced Healthcare Materials, 6(4), 2017.
Rahman et al., Additive Manufacturing with 3D Printing: Progress from Bench to Bedside, AAPS J. 20:101, 2018.
Ramsubeik et al., Silicone-Induced Foreign Body Reaction: An Unusual Differential Diagnosis of Posterolateral Hip Pain, Case Rep. Med., vol. 2018, ID1802794, 2018.
Rutz, et al., "A Multimaterial Bioink Method for 3D Printing Tunable, Cell-Compatible Hydrogels," Advanced Materials, 27(9), 1607, 2015.
Shin, et al., "Cell-adhesive and mechanically tunable glucose-based biodegradable hydrogels," Acta Biomater, 7, 106-114, 2011.
Spater, et al., "In vivo biocompatibility, vascularization, and incorporation of Integra® dermal regenerative template and flowable wound matrix," J Biomed Mater Res B Appl Biomater, 106(1), 52-60, 2018.
Suntornnond, et al., "A highly printable and biocompatible hydrogel composite for direct printing of soft and perfusable vasculature-like structures," Scientific Reports, 7:16902, 3, 2017.
Tanabe, et al., "Nipple-areola reconstruction with a dermal-fat flap and rolled auricular cartilage," Plastr. Reconstr. Surg., 100(2), 431-438, 1997.
Temenoff et al., "Effect of poly(ethylene glycol) molecular weigh on tensile and swelling properties of oligo(poly (ethylene glycol) fumarate) hydrogels for cartilage tissue engineering," J. Biomed. Mater. Res. 59:429-437, 2002.
Töyräs et al., "Estimation of the Young's modulus of articular cartilage using an arthoscopic indentation instrument and ultrasonic measure of tissue thickness," J. Biomech., 34, 251-256, 2001.
Upadhyaya, et al., Outcomes of Autologous Fat Grafting in Mastectomy Patients Following Breast Reconstuction, Ann. Surge. Oncol. 25(10): 3052-3056, 2018.
Van Bellegehm, et al., "Hybrid 3D Printing of Synthetic of Cell-Laden Bioinks for Shape Retaining Soft Tissue Grafts," Adv Funct Mater, 2020, 30(3), 1907145, 2020.
Van Nieuwenhove, et al., "Soft tissue fillers for adipose tissue regeneration: From hydrogel development toward clinical applications," Acta Biomater, 63, 37-49, 2017.
Vats, et al., "Nanoscale physiochemical properties of chain- and step-growth polymerized PEG hydrogels affect cell-material interactions," J Biomed Mater Res A., 105(4), 1112-1122, 2017.
Wang, et al., "Development of a Photo-Crosslinking, Biodegradable GelMA/PEGDA Hydrogel for Guided Bone Regeneration Materials," Materials, 11(8), E1345, 2018.
Yang, et al., "3D Printing of a Double Network Hydrogel wit a Compression Strength and Elastic Modulus Greater than those of Cartilage," ACS Biomater Sci Eng., 3, 863-869, 2017.
Zehnder, et al., "Evaluation of an alginate-gelatine crosslinked hydrogel for bioplotting," Biofabrication, 7(2), 025001, 2015.
Zhang, et al., "Dual-Responsive Hydrogels for Direct-Write 3D Printing," Macromolecules, 48(18), 6482-6488, 2015.
Zhang, et al., "High-water-content and resilient PEG-containing hydrogels with low fibrotic response," Acta Biomater, 53, 100-108, 2017.
Zhong, et al., "Tissue scaffolds for skin wound healing and dermal reconstruction," Wiley Interdisciplinary Reviews, Nanomedicine and Nanobiotechnology, 2(5), 510-525, 2010.
Zhu, "Bioactive Modification of Poly(ethylene glycol) Hydrogels for Tissue Engineering," Biomaterials, 31(17), 4639-4656, 2010.
"Thrombin for Human Plasma," Sigma-Aldrich Product Information, Catalog No. T6884, 1-2, 2017.
"Thrombin, Active SignalChem," 1-2, 2017.
Aiger et al., "4-points congruent sets for robust pairwise surgace registration," ACM Trans. Graphics 27: 85, 2008.
Arda et al., "Quantitative assessment of normal soft-tissue elasticity using shear-wave ultrasound elastography," Am. J. Roentgenol, 197: 532-536, 2011.
Arumugasaamy et al., "Biomimetic placenta-fetus model demonstrating maternal-fetal transmission and fetal neural toxicity of zika virus," Ann. Biomed. Eng., 46:1963-1974, 2018.
Arumugasaamy et al., "In Vitro Models for Studying Transport Across Epithelial Tissue Barriers," Ann. Biomed. Eng., 47:1-21, 2019.
Badylak et al., "The extracurricular matrix as a biologic scaffold material," Biomaterials, 28, 3587-3593, 2007.
Bashir, et al., Outcome of Conventional Adipose Tissue Grafting for Contour Deformities of Face and Role of Ex Vivo Expanded Adipose Tissue-Dervised Stem Cells in Treatment of Such Deformities, J. Craniofacial Surg. 29: 1143-1147, 2018.

(56) References Cited

OTHER PUBLICATIONS

Bertassoni, et al., "Direct-write bioprinting of cell-laden methacrylated gelatin hydrogels," Biofabrication 6(2014), 1-11.
Cao, et al., "Tissue-engineered nipple reconstruction," Plast. Reconstr. Surg. 102(7), 2293-2298, 1998.
Carlson, et al., "Epidermal stem cells are preserved during commercial scale manufacture of a bilayered, living skin substitute (Apligraf (R)) utilized for chronic wound repair," Wound Repair and Regeneration | 7(2), A27.
Chae et al., "3D Bioprinting in Nipple-Aerola Complex Reconstruction," Springer International Publishing, 587, 2018.
Chen, et al., "Fabrication of tough poly(ethylene glycol)/collagen double network hydrogels for tissue engineering," J Biomed Mater Res Part A, 192-200, 2018.
Chhaya, et al., "Sustained regeneration of high-volume adipose tissue for breast reconstruction using computer aided design and biomanufacturing," 52 (2015), 551-560, 2015.
Choi, et al. (2019) "Recent advances in photo-cross linkable hydrogels for biomedical applications," BioTechniques 66:40-53.
Collins, et al., "Nipple Reconstruction with the Biodesign Nipple Reconstruction Cylinder: A Prospective Clinical Study," Plast. Reconstr. Surg.—Global Open 4(8), 2016.
Cubo, et al., "3D bioprinting of functional human skin: production and in vivo analysis, " Biofabrication 9(1), 2017.
Dhandayuthapani, et al., "Polymeric Scaffolds in Tissue Engineering Application: A Review," Int. J. Polvm. Sci. vol. 2011, 290602, 2011.
Dubbin et al., "Quantitative criteria to benchmark new and existing bio-inks for cell compatibility," Biofabrication 9(4): 004102, 2017.
Egles, et al., "Three-Dimensional Human Tissue Models of Wounded Skin, Epidermal Cells: Methods and Protocols," Second Edition 585:345-359, 2009.
Eto et al., The fate of adipocytes after nonvascularized fat fragting: evidence of early death and replacement of adipocytes, Plast. Reconstr. Surg., 129:1081-1092, 2012.
Fairbanks, et al., "A Versatile Synthetic Extracellular Matrix Mimic via Thiol-Norbornene Photopolymerization," Adv Mater. 21:5005-5010, 2009.
Garramone, et al., "Use of AlloDerm in primary nipple reconstruction to improve long-term nipple protection," Plast. Reconstr. Surg.l 19(6): 1663-1668, 2007.
Goes, et al., "The Application of Mesh Support in Periareolar Breast Surgery: Clinical and Mammographic Evaluation," Aesthetic Plastic Surgery, 2004(28), 268-274, 2004.
Grevious et al., "Staged approach for abdominal wound closure following combined liver and intestinal transplation from living donors in pediatric patients," Pedatric Transplatation, 2009(13), 177-181, 2008.
Hemmrich, et al., "Autologous in vivo adipose tissue engineering in hyaluronan-based gels—a pilot study," Surg. Res. 144:82-88, 2008.
Hockaday, et al., "Rapid 3D printing of anatomically accurate and mechanically heterogenous aortic valve hydrogel scaffolds," Biofabrication, 4(3), 2012.
Holmes et al., "Thiol-Ene Photo-Click Collagen-PEG Hydrogels: Impact of Water-Soluable Photoinitiators on Cell Viability, Gelation Kinetics and Rheological Properties," Polymers, 9, 226, 2017.
Hong, et al., "3D Printing of Highly Stretchable and Tough Hydrogels into Complex, Cellularized Structures," Adv. Mater, 27:4035-4040, 2015.
Humphrey, Review Paper: Continuum bioemechanics of soft biological tissues, Proc. R. Soc. London, Ser. A., 459:3-46, 2003.
Iivarinen et al., "Experimental and numerical analysis of soft tissue stiffness measurement using manual indentation device—significance of indentation geometry and soft tissue thickness," Skin Res. Technol., 20: 347-354, 2014.
Im, et al., "Skin Regeneration with a Scaffold of Predefined Shape and Bioactive Peptide Hydrogels," Tissue Eng., Part A, 24:1518-1530, 2018.
Jia et al., "Direct 3D bioprinting of perfusable vascular constructs using a blend bioink," Biomaterials, 106, 58-68, 2016.
Jia, et al., "Engineering alginate as bioink for bioprinting," Acta Biomater, 10:4323-4331, 2014.
Jin, et al., "Self-Supporting Nanoclay as Internal Scaffold Material for Direct Printing of Soft Hydrogel Composite Structures in Air," ACS Appl Mater Interfaces 9:17456-17465, 2017.
Kim, et al., "Direct 3D cell-printing of human skin with functional transwell system," Biofabrication 9(2), 2017.
Kolesky et al., "Three-dimensional bioprinting of thick vascularizd tissues," Proc. Natl. Acad. Sci. USA, 113: 3179-3184, 2006.
Krieger et al., "Spatially localized recruitment of anti-inflammatory monocytes by SDF-1a-releasing hyrdogels enhances microvascular network remodeling," Biomaterials 77: 280-290, 2016.
Kuo et al., "Repair of Tympanic Membrane Perforations with Customized Bioprinted Ear Grafts Using Chinchilla Models," Tissue Eng., Part A, 24:527-535, 2018.
Kuo et al., "Trophoblast-endothelium signaling involves angiogenesis and apoptosis in a dynamic bioprinted placenta model," Biotechnol. Bioeng. 116:181-192, 2019.
Lee, et al., "Design and Fabrication of Human Skin by Three-Dimensional Bioprinting," Tissue Engineering, 1-12, 2014.
Lee, et al., "Multi-layered culture of human skin fibroblasts and keratinocytes through three-dimensional freeform fabrication," Biomaterials 30(8): 1587-1795, 2009.
Liaw, et al., "Engineering 3D Hydrogels for Personalized In vitro Human Tissue Models," Adv Healthcare Mater, 7:1701165, 2018.
Lin et al., Adventures and Misadventures in Plastic Surgery and Soft-Tissue Implants, RadioGraphics 37: 2145-2163, 2017.
Lin, et al., "Thiol-norbornene photo-click hydrogels for tissue engineering applications," J Appl Polm Sci., 132:41563, 2015.
Liu, et al., "Ultrastretchable and Self-Healing Double Network Hydrogel for 3D Printing and Strain Sensor," ACS Appl Mater Interfaces 9:26429-26437, 2017.
Lode, et al., "Additive manufacturing of collagen scaffolds by three-dimensional plotting of highly viscous dispersions," Biofabrication 8:014015, 2016.
Longo et al., "Tendon augmentation grafts: a systematic review," British Medical Bulletin, 94, 165-188, 2010.
Mahadik et al., "The use of covalently immobilized stem cell factor to selectively affect hematopoietic stem cell activity with a gelatin hydrogel," Biomaterials 67: 297-307, 2015.
Mahoney, et al., "Current Therapeutic Strategies for Adipose Tissue Defects/Repair Using Engineered Biomaterials and Biomolecule Formulations," Front Pharmacol, 9:507, 2018.

* cited by examiner

Figure 6
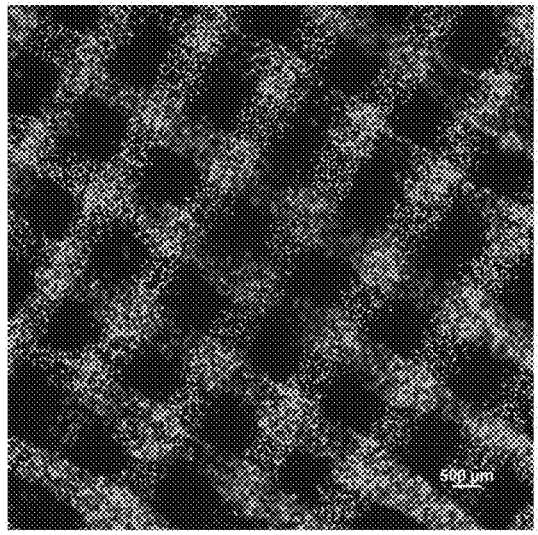
(A)
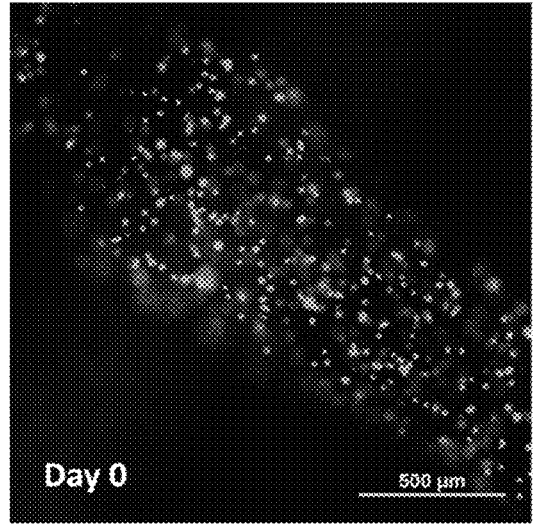
(B) Day 0
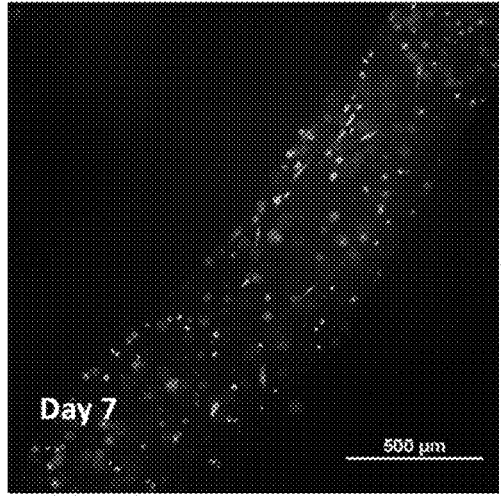
(C) Day 7
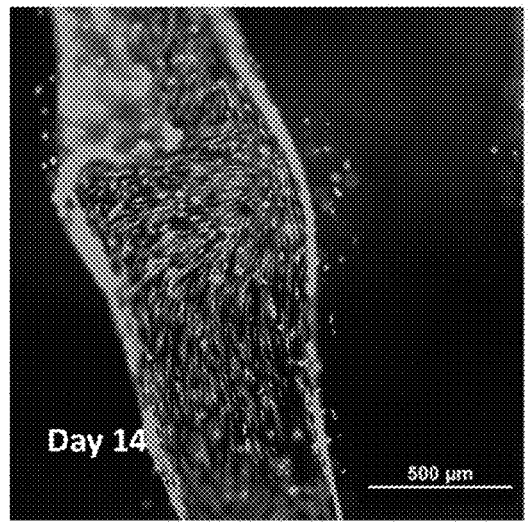
(D) Day 14

Figure 6 (cont.)
(E)
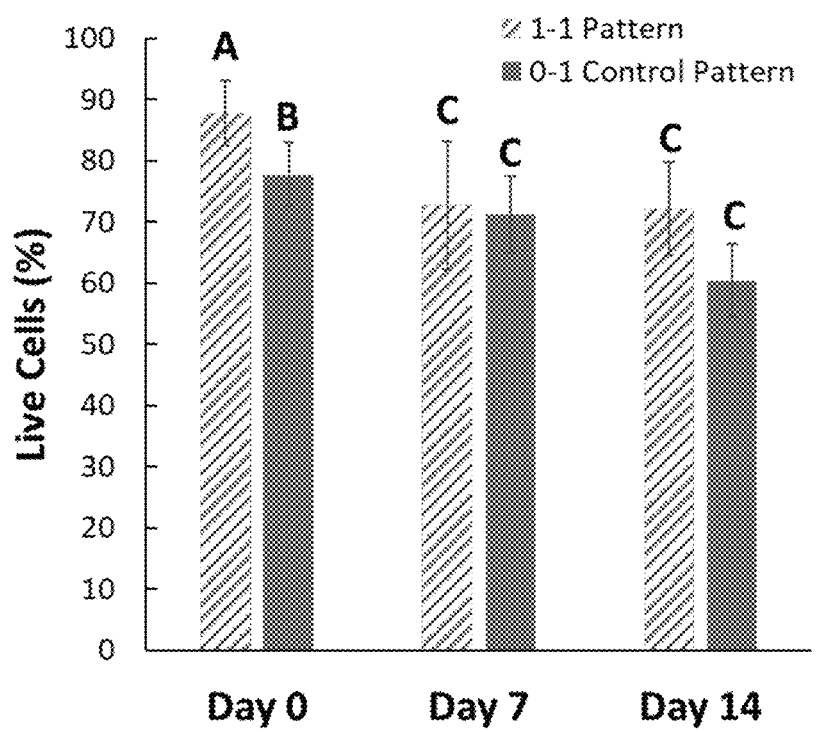
(F)
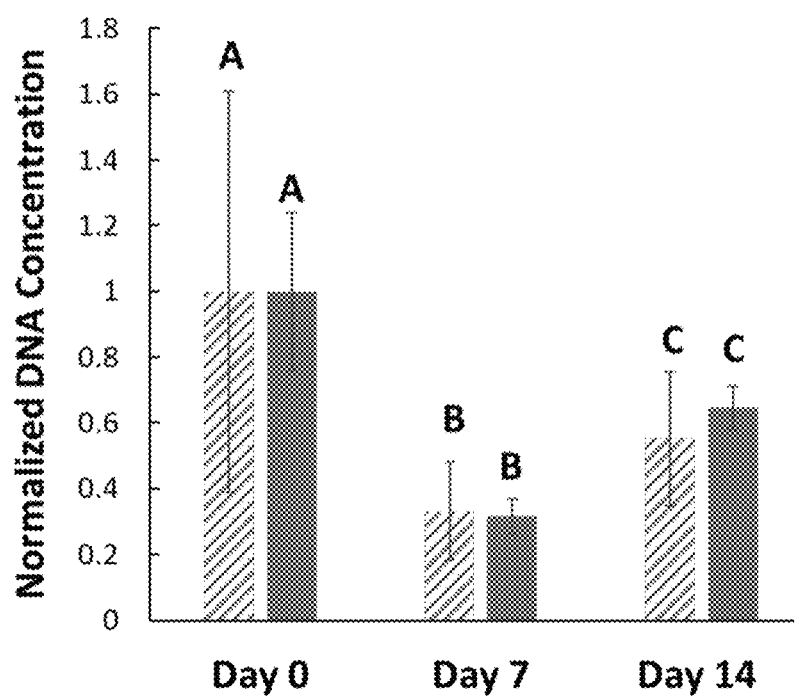

Figure 8
(A)
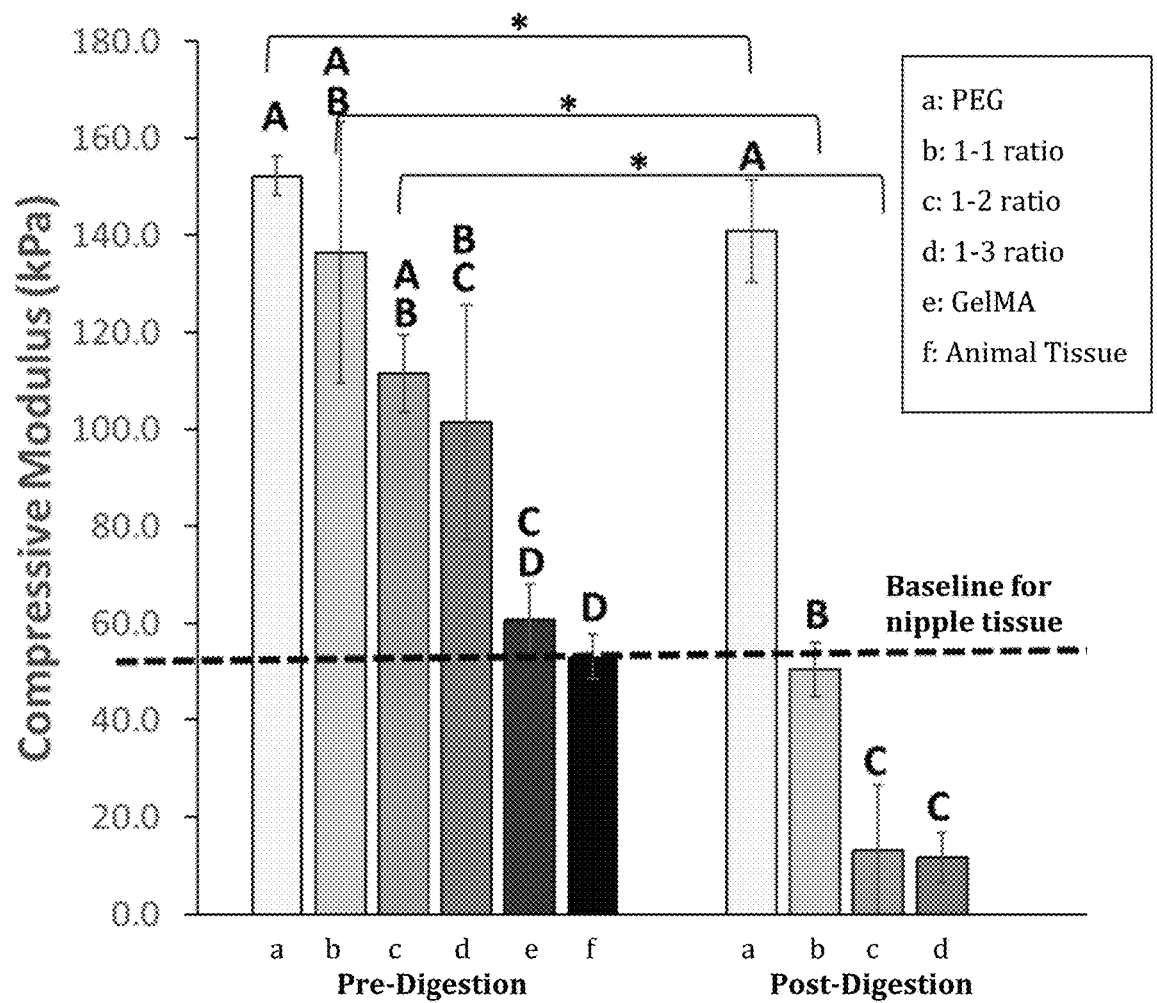
(B)
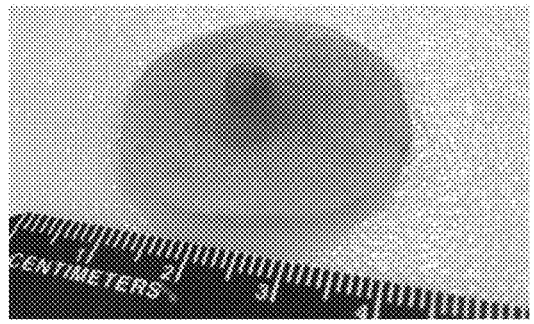

Figure 11
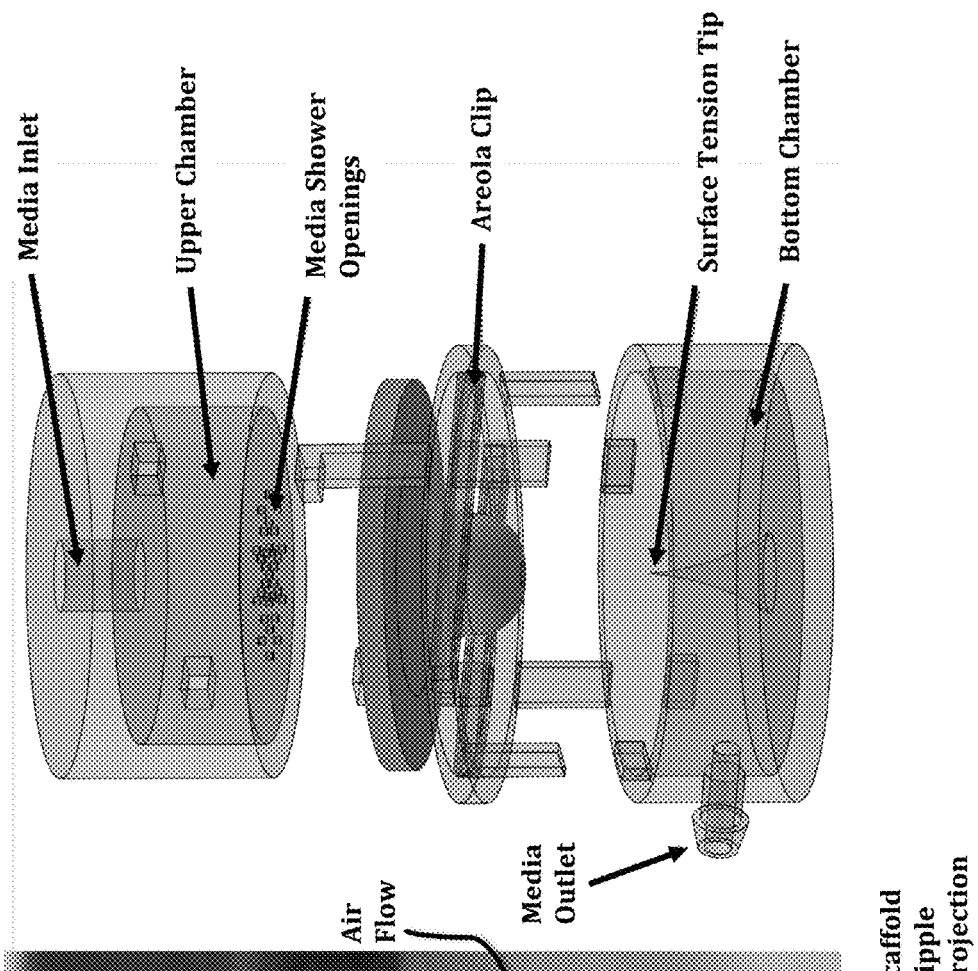
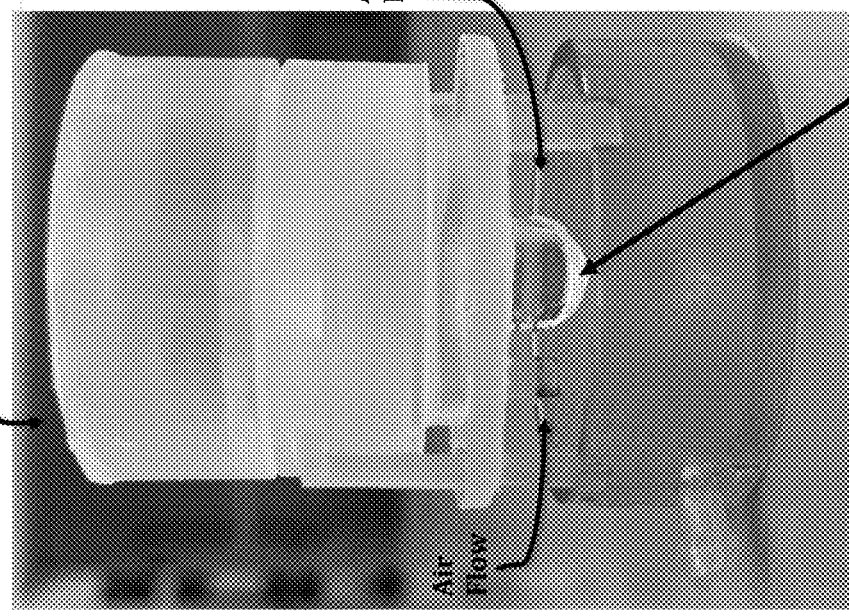

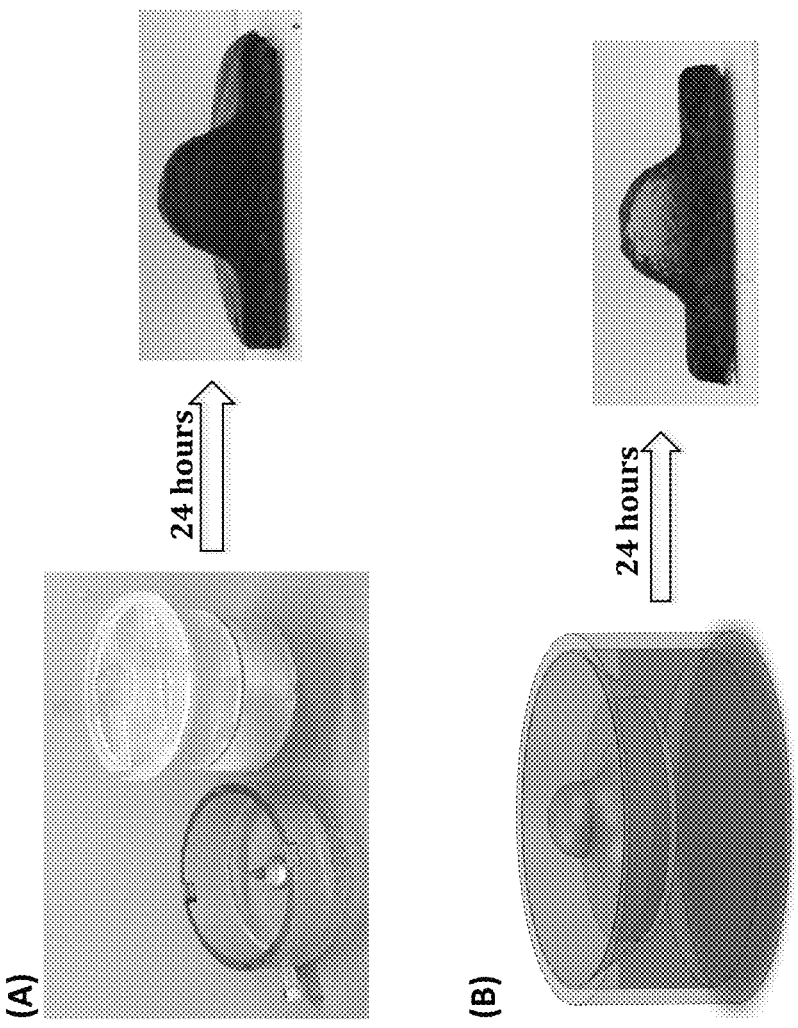
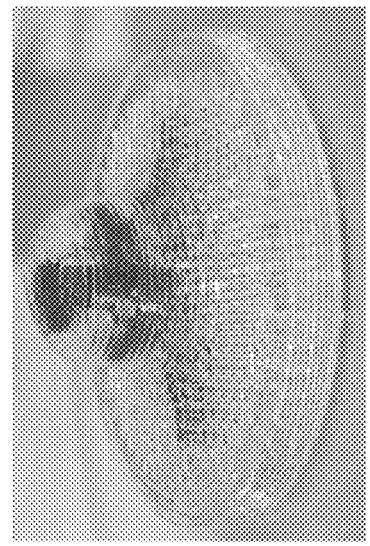

3D PRINTED SCAFFOLD STRUCTURES AND METHODS OF FABRICATION

CROSS-REFERENCE TO RELATED APPLICATIONS

This application claims benefit of U.S. patent application Ser. No. 16/846,583, entitled "Nipple-Areola Reconstructive Implants," filed Apr. 13, 2020, which claims the benefit of U.S. Provisional Patent Application Ser. No. 62/832,352, filed Apr. 11, 2019, which are incorporated herein by reference in their entirety.

STATEMENT REGARDING FEDERALLY SPONSORED RESEARCH OR DEVELOPMENT

This invention was made with government support under Grant No. CBET 1604742 awarded by the National Science Foundation (NSF). The United States government has certain rights in this invention.

FIELD OF THE INVENTION

The present disclosure relates to an implantable scaffold device comprising a non-biodegradable support portion and a biodegradable dermal portion comprising live cells, and methods of fabricating such device via 3D printing.

BACKGROUND OF THE INVENTION

Despite recent advances in clinical procedures, the repair of soft tissue remains a reconstructive challenge. Soft tissue defects may occur due to several causes, ranging from simple contour incongruencies due to congenital deformities to large volume tissue loss following deep burns, trauma, or tumor resection. Current technologies such as synthetic implants and dermal flap autografting result in inefficient shape retention and unpredictable aesthetic outcomes. Soft tissue defects therefore remain as irremediable obstacles in current reconstructive cases. The term "soft tissue" can refer to both connective tissues (e.g., tendons, ligaments, skin, adipose fat, synovial membranes) and non-connective tissues (e.g., muscles, nerves, blood vessels) (J. D. Humphrey (2003) *Review Paper: Continuum biomechanics of soft biological tissues*, Proc. R. Soc. London, Ser. A. 459:3-46). Because soft tissue defects range in size, shape, and tissue composition, there is no single solution capable of reconstructing replacement tissue with identical volume and mechanical properties.

Current clinical techniques attempt to address these challenges with natural materials, such as free adipose tissue grafts and autologous dermal fat flaps, and synthetic materials, such as commercially available silicone implants (H. Eto et al. (2012) *The fate of adipocytes after nonvascularized fat grafting: evidence of early death and replacement of adipocytes*, Plast. Reconstr. Surg. 129:1081-1092; I. Van Nieuwenhove et al. (2017) *Soft tissue fillers for adipose tissue regeneration: From hydrogel development toward clinical applications*, Acta Biomater. 63:37-49). Unfortunately, conventional strategies present significant complications.

Though free adipose tissue can be resected safely with a minimally invasive procedure, the autologous fat transfer experiences significant volume augmentation due to the limited survival of mature adipocytes post liposuction trauma. Contour irregularity, lumpiness, and graft resorption make this grafting technique inefficient and unsuccessful (A. Monfort & A. Izcta (2012) *Strategies for Human Adipose Tissue Repair and Regeneration*, J. Cosmet. Dermatol. Sci. Appl. 2:93-107). Dermal fat flap harvest, a technique that completely resects large sections of skin and fat tissue in an attempt to retain its vasculature and structure, is a technique limited by the donor site and can lead to site morbidity, pain, scarring, and often shrinkage and fibrosis post implantation (C. M. Mahoncy et al. (2018) *Current Therapeutic Strategies for Adipose Tissue Defects/Repair Using Engineered Biomaterials and Biomolecule Formulations*, Front. Pharmacol. 9:507; S. N. Upadhyaya et al. (2018) *Outcomes of Autologous Fat Grafting in Mastectomy Patients Following Breast Reconstruction*, Ann. Surg. Oncol. 25(10):3052-3056; M. Bashir et al. (2018) *Outcome of Conventional Adipose Tissue Grafting for Contour Deformities of Face and Role of Ex Vivo Expanded Adipose Tissue-Derived Stem Cells in Treatment of Such Deformities*, J. Craniofacial Surg. 29: 1143-1147).

Some synthetic materials are capable of retaining their mechanical properties. However, they are commonly associated with implant migration, rupture and/or breakdown, and fibrotic encapsulation from the immune system's foreign body response (D. J. Lin et al. (2017) *Adventures and Misadventures in Plastic Surgery and Soft-Tissue Implants*, RadioGraphics 37:2145-2163; K. Ramsubcik et al. (2018) *Silicone-Induced Foreign Body Reaction: An Unusual Differential Diagnosis of Posterolateral Hip Pain*, Case Rep. Med. Vol. 2018, ID1802794). Although for different reasons, all current clinical treatment strategies result in low patient satisfaction due to the absence of long-term graft retention and aesthetic restoration.

Prophylactic mastectomy rates have more than tripled in the past decade (K. L. Kummerow et al. (2015) *Nationwide trends in mastectomy for early-stage breast cancer*, JAMA Surg 150(1):9-16). As such, the demand for breast reconstruction practices and increasing nationwide desire in restoring body image represent a significant unmet clinical need in soft tissue repair. With recent estimates of more than ~250,000 new cases of invasive breast cancer occurring each year in the US, a significant number of patients (58%) are predicted to choose to have their breast tissue removed via total mastectomy (Society, A. C., Breast Cancer Facts & FIGS. 2017-2018. Atlanta: American Cancer Society, Inc, 2017; Y. Cemal et al. (2013) *A paradigm shift in U.S. breast reconstruction: Part 2. The influence of changing mastectomy patterns on reconstructive rate and method*, Plast Reconstr Surg 131(3):320c-6c).

Breast-conserving surgery (BCS), where only the cancerous tissue is removed from the chest, is generally not an option in patients with a high tumor-to-breast ratio, those with multicentric cancers, or those with inflammatory or locally advanced cancers. In most breast cancer cases, the cancer has spread through the ductal tract of the mammary glands and impacts the health of the nipple tissue, resulting in the inability to undergo nipple-sparing mastectomy (H. A. Cense et al. (2001) *Nipple-sparing mastectomy in breast cancer: a viable option?* European J. Surg. Oncol. 27(6): 521-526). Systemic therapies, including chemo, targeted, and hormonal therapy, are often combined with some type of surgery but are not effective in curing the disease alone. Though the risks of complications are nearly twice as high for women who undergo mastectomy than those in BCS procedures, many BCS-eligible women continue to have the invasive procedure due to reluctance to undergo radiation therapy after BCS, the desire for uniform aesthetic outcomes, and fear of cancer recurrence (K. L. Kummerow et al. (2015) *Nationwide trends in mastectomy for early-stage breast cancer*, JAMA Surg 150(1):9-16; Cemal, Y. et al. (2013) *A Paradigm Shift in U.S. Breast Reconstruction: Part 2. The Influence of Changing stpMastectomy Patterns on Reconstructive Rate and Method*, Plastic and Reconstructive Surgery 131:320E-326E; T. M. Tuttle et al. (2007) *Increasing use of contralateral prophylactic mastectomy for breast cancer patients: A trend toward more aggressive surgical treatment*, J. Clin. Oncol. 25(33):5203-5209). Furthermore, women who are diagnosed with breast cancer in one breast are likely to choose to have the unaffected breast removed as well (contralateral prophylactic mastectomy) (S. M. Wong et al. (2017) *Growing Use of Contralateral Prophylactic Mastectomy Despite no Improvement in Long-term Survival for Invasive Breast Cancer*, Annals of Surgery 265(3):581-589).

Approximately 40% of all patients enduring a mastectomy in the United States undergo breast reconstruction (C. R. Albornoz et al. (2013) *A paradigm shift in U.S. Breast reconstruction: increasing implant rates*, Plast Reconstr Surg 131(1):15-23). As such, the ability to restore body image of these patients is a significant challenge that should not be taken lightly. Reconstruction of the breast mound using silicone implants has made it possible to rebuild a mirage of the natural organ lost from surgery, which helps the patient psychologically heal from her significant mass loss of self-identifying tissue. Plastic surgeons have found, however, that the restoration of the critical visual landmark—the nipple-areola complex—is influential in the emotional recovery of their patients (D. Harcourt et al. (2011) *Patient satisfaction in relation to nipple reconstruction: The importance of information provision*, J. Plastic, Reconst. & Aesth Surg. 64(4):494-499). Without that visual cue, the breast reconstruction is merely a mound whose most notable feature is the central scar left from the mastectomy. These scars psychologically serve as a negative reminder of the disease's impact on the patient, and severe emotional disturbances such as fear, depression, poor self-esteem, and anxiety develop in about 80% of affected women (D. Wei et al. (2016) *Effectiveness of Physical, Psychological, Social, and Spiritual Intervention in Breast Cancer Survivors: An Integrative Review*, In Asia Pac J Oncol Nurs, Vol. 3, pp 226-32). As such, nipple reconstruction represents an important psychological healing experience for women that have undergone this invasive procedure. However, restoring the appearance of a nipple-areola complex directly on the reconstructed breast remains an unresolved clinical challenge.

A primary objective of nipple reconstruction is to create the appearance of a nipple-areola complex that is symmetrical with the contralateral breast in terms of pigmentation and size, and to construct a nipple that maintains projection. Since all mammary gland tissue has been previously resected, there is no need for the constructed nipple to properly function. Various strategies have been developed for nipple reconstruction, such as the suturing of local skin flaps (S. Eo et al. (2007) *Nipple reconstruction with C-V flap using dermofat graft*, A. Plas. Surg. 58(2):137-140; R. W. Bernard et al. (2003) *Autologous fat graft in nipple reconstruction*, Plas. Reconst. Surg. 112(4):964-968) cartilage, bone and fat tissue implants (B. Brent & J. Bostwick (1977) *Nipple-Areola Reconstruction with Auricular tissues*, Plast. Reconstr. Surg. 60(3):353-361; Y. Cao et al. (1998) *Tissue-engineered nipple reconstruction*, Plast. Reconstr. Surg. 102(7):2293-22981; A. Heitland et al. (2006) *Long-term nipple shrinkage following augmentation by an autologous rib cartilage transplant in free DIEP-flaps*, J. Plast. Reconstr. Aesth. Surg. 59(10): 1063-1067; H. Y. Tanabe et al. (1997) *Nipple-areola reconstruction with a dermal-fat flap and rolled auricular cartilage*, Plast. Reconstr. Surg. 100 (2):431-438; K. K. Evans et al. (2005) *The use of calcium hydroxylapatite for nipple projection after failed nipple-areolar reconstruction—Early results*, Annals Plast. Surg. 55(1):25-29), partial transplantation of the contralateral nipple (nipple sharing) (T. Nakagawa et al. (2003) *Cryopreserved autologous nipple-areola complex transfer to the reconstructed breast*, Plast. Reconstr. Surg. 111(1):141-147; M. R. Zenn et al. (2009) *Unilateral Nipple Reconstruction with Nipple Sharing: Time for a Second Look*, Plast. Reconstr. Surg. 123(6): 1648-1653), rolled dermal grafts (C. E. Garramone & B. Lam (2007) *Use of AlloDerm in primary nipple reconstruction to improve long-term nipple projection*, Plast. Reconstr. Surg. 119(6): 1663-1668; B. Collins et al. (2016) *Nipple Reconstruction with the Biodesign Nipple Reconstruction Cylinder: A Prospective Clinical Study*, Plast. Reconstr. Surg.—Global Open 4(8)), and synthetic silicone implants (J. Jankau et al. (2011) *A new method for using a silicone rod for permanent nipple projection after breast reconstruction procedures*, Breast 20(2): 124-128).

Nipple reconstruction using skin flap suturing (SFS), wherein a star configuration of cut breast skin is knotted onto itself with sutures, is the current gold standard in restoring the look of nipple tissue. SFS has become a regular post-operative procedure following patient healing of the initial silicone implantation that aims to rebuild the appearance of the patient's new tissue. Skin located at the highest point of the reconstructed breast mound is incised to small skin flaps that are sutured together to build an elevated skin tab. Intradermal tattooing is somewhat effective for creating areolar hyperpigmentation. Darker pigmented skin harvested from the patient's inner thigh or groin can also be used as grafts to produce the characteristic coloration of the areola around the projection (G. Pizzonia et al. (2017) *Alternative technique for nipple-areola complex reconstruction with poor skin condition*, ANZ J Surg 87(10):E121-e124).

Unfortunately, the outcome of conventional procedures such as SFS is an inevitable loss of projection with contracture due to wound healing effects. The sutured knot initially experiences local hemostasis and inflammation from leaky damaged blood vessels, triggering an influx of activated platelets and white blood cells to the injury site. Immune cells have been shown to secrete collagenase, among other proteolytic enzymes, which immediately begin to degrade the forced collagen network of the knot (P. Martin (1997) *Wound healing—Aiming for perfect skin regeneration*, Science 276(5309):75-81). Granule tissue formation (fibroblast growth and deposition of new extracellular matrix by the excrement of collagen I and fibronectin) (S. P. Zhong et al. (2010) *Tissue scaffolds for skin wound healing and dermal reconstruction*, Wiley Interdisciplinary Reviews-Nanomedicine and Nanobiotechnology 2(5):510-525) and epithelialization (proliferation and crawling of epithelial cells atop the wound bed providing a cover for the new tissue) are necessary for the projection to effectively heal and maintain its proper shape. However, wound contraction and scar formation can affect these processes. Recruited myofibroblasts attempt to decrease the size of the wound by gripping the wound edges and contracting using cellular mechanisms similar to those of smooth muscle cells (P. Martin (1997) *Wound healing—Aiming for perfect skin regeneration*, Science 276(5309):75-81). The skin lesion is usually healed within 3 weeks; however, the end result is neither aesthetically nor functionally ideal. More specifically, the developed connective scar tissue, where the collagen matrix has been poorly reconstituted, results in a flattened disfigured skin tab. It has been reported that current SFS techniques demonstrate a disappointing 60-70% loss of projection from the time of surgery within 12 months postoperatively (C. E. Garramone et al. (2007) *Use of AlloDerm in primary nipple reconstruction to improve long-term nipple projection*, Plast. Reconstr. Surg. 119(6): 1663-1668).

Various incision techniques have been investigated, such as C-V flaps, Skate flaps, Star flap, and Purse-String Suture (S. Caterson et al. (2018) *Reconstruction of Areolar Projection Using a Purse-String Suture Technique*, Plast Reconstr Surg Glob Open. 3(7):e453; K. Y. Hong et al. (2017) *Immediate Nipple Reconstruction During Implant-Based Breast Reconstruction*, Aesthetic Plast Surg. 41(4):793-799; E. D. Cronin et al. (1988) *Nipple Reconstruction—The S-Flap*, Plast Reconstr Surg. 81(5):783-787; K. Narra et al. (2008) *A new approach to nipple reconstruction: The modified s-flap*, Plast Reconstr Surg. 122(2):89E-90E; J. H. Kim et al. (2016) *A Revision Restoring Projection after Nipple Reconstruction by Burying Four Triangular Dermal Flaps*, Archives Plast Surg Aps 43(4):339-343; C. A. Riccio et al. (2015) *Review of Nipple Reconstruction Techniques and Introduction of V to Y Technique in a Bilateral Wise Pattern Mastectomy or Reduction Mammaplasty*, In Eplasty, Vol. 15). Regardless of the skin flap incision pattern used to suture breast skin tissue into a nipple shape, the result remains a flattened skin tab scar that requires repeated additional treatments throughout the patient's life. The act of repetitive reconstructive surgery is yet another detrimental psychological challenge such patient's regularly face, adding even more difficulty to overcoming their disease.

Thus, conventional procedures such as SFS have not been adequate, exhibiting high rates of infection, multidirectional scarring, and severe nipple flattening, which ultimately cause the patient to endure multiple surgical procedures in her lifetime. Surgical procedures that necessitate repeated intervention due to projection loss are not appropriate for the psychological health needs of breast cancer survivors. Further, as the insertion of additional material to the dermal flap does enhance the projection for extended periods of time, dissatisfaction remains among patients due to the foreign material's stiff sensation. Multidirectional scarring is also a prevalent result from these procedures, since complicated dermal flaps are still necessary to suture the addition in place. Autologous grafting report complications of infection, seroma, and fat necrosis, while allogeneic and synthetic materials have similar complications along with additional risks of exposure and over projection.

A method that produces a more in vivo-like sensation, regular projection, and minimal scarring would aid in patient satisfaction. A tissue engineering based solution would not only aid in the development of a more robust and aesthetically pleasing nipple but also act as a form of therapy for the patient due to the nature of these reconstructive cases. Better technologies to control nipple flattening and a more reliable method for the construction of a normal-looking nipple are needed in order to improve clinical outcomes from nipple reconstruction. The subcutaneous implantation of a nipple-shaped prosthetic would theoretically be a solution to restore the native nipple feature; however, this approach would just emphasize the scar left from the mastectomy and present the same psychological burdens noted above. As such, prior attempts to provide such an implant have not been successful. Restoration of the skin anatomy/physiology is required in order to bypass this shortcoming.

Over the past several decades, advances in cell biology have led to achievements in skin tissue regeneration for wound healing (S. Zhong et al. (2010) *Tissue scaffolds for skin wound healing and dermal reconstruction*, Wiley Interdisciplinary Reviews—Nanomedicine and Nanobiotechnology 2(5):510-525). Tissue engineered skin substitutes have been fabricated using a variety of methods, ranging from basic mold and casting techniques (C. Egles et al. (2009) *Three-Dimensional Human Tissue Models of Wounded Skin, Epidermal Cells: Methods and Protocols*, Second Edition 585:345-359; J. Shepherd et al. (2009) *Development of Three-Dimensional Tissue-Engineered Models of Bacterial Infected Human Skin Wounds*, Tissue Engineering Part C-Methods 15(3):475-484) to the more advanced electrospinning techniques (J. A. Matthews et al. (2002) *Electrospinning of collagen nanofibers*, Biomacromolecules 3(2): 232-238; H. M. Powell et al. (2008) *Influence of electrospun collagen on wound contraction of engineered skin substitutes*, Biomaterials 29(7):834-843; K. S. Rho et al. (2006) *Electrospinning of collagen nanofibers: Effects on the behavior of normal human keratinocytes and early-stage wound healing*, Biomaterials 27(8): 1452-1461).

In addition, several commercial products are available to clinically treat cutaneous wounds (S. J. Park et al. (2018) *The application of an acellular dermal allograft (AlloDerm) for patients with insufficient conjunctiva during evisceration and implantation surgery*, Eye 32(1): 136-141; A. D. Rogers et al. (2017) *The use of Biobrane (R) for wound coverage in Stevens-Johnson Syndrome and Toxic Epidermal Necrolysis*, Burns 43(7): 1464-1472; Y. O. Kok et al. (2018) *Early definitive treatment of partial-thickness alkali burns with tangential excision and biobrane*, Archives of Plastic Surgery-Aps 45(2): 193-195; T. Spater et al. (2018) *In vivo biocompatibility, vascularization, and incorporation of Integra((R)) dermal regenerative template and flowable wound matrix*, J Biomed Mater Res B Appl Biomater. 106(1):52-60; M. Carlson et al. (2009) *Epidermal stem cells are preserved during commercial scale manufacture of a bilayered, living skin substitute (Apligraf (R)) utilized for chronic wound repair*, Wound Repair and Regeneration 17(2): A27-A27; J. Mansbridge (2006) *Dermagraft—human fibroblast-derived dermal substitute*, J Anatomy 209(4):571-571; R. Gobet et al. (1997) *Efficacy of cultured epithelial autografts in pediatric burns and reconstructive surgery*, Surgery 121(6):654-661; T. E. Serena (2008) *Orcel Study*, Wound Repair and Regeneration 16(2):A22-A22; C. T. Ong et al. (2015) *Preclinical Evaluation of Tegaderm (TM) Supported Nanofibrous Wound Matrix Dressing on Porcine Wound Healing Model*, Advances in Wound Care 4(2):110-118). While such conventional products have provided some benefit, such materials are only suitable for the covering of flat surfaces.

More recently, bioprinting has been utilized in an attempt to replicate natural skin anisotropy (W. Lee et al. (2009) *Multi-layered culture of human skin fibroblasts and keratinocytes through three-dimensional freeform fabrication*, Biomaterials 30(8): 1587-1595; W. L. Ng et al. (2018) *Proof-of-concept: 3D bioprinting of pigmented human skin constructs*, Biofabrication 10(2); L. Koch et al. (2012) *Skin tissue generation by laser cell printing*, Biotechnology and Bioengineering 109(7): 1855-1863; L. J. Pourchet et al. (2017) *Human Skin 3D Bioprinting Using Scaffold-Free Approach*, Advanced Healthcare Materials 6(4); S. Michael et al. (2013) *Tissue Engineered Skin Substitutes Created by Laser-Assisted Bioprinting Form Skin-Like Structures in the Dorsal Skin Fold Chamber in Mice*, Plos One 8(3); B. S. Kim et al. (2017) *Direct 3D cell-printing of human skin with functional transwell system*, Biofabrication 9(2); N. Cubo et al. (2017) *3D bioprinting of functional human skin: production and in vivo analysis*, Biofabrication 9(1)). However, the application of 3D printing technology to the bioengineering field remains relatively limited, with few studies reporting extrudable synthetic hydrogel inks for pneumatic deposition printing practices. Moreover, only a handful of groups have reported on the production of extrudable hydrogels containing poly(ethylene glycol) (PEG) components despite the use of PEG in both biosensing platforms and cell behavioral studies (see, e.g., A. L. Rutz et al. (2015) *A Multimaterial Bioink Method for 3D Printing Tunable, Cell-Compatible Hydrogels*, Advanced Materials 27(9): 1607; S. M. Hong et al. (2015) *3D Printing of Highly Stretchable and Tough Hydrogels into Complex, Cellularized Structures*, Advanced Materials 27(27):4035-4040; M. S. Zhang et al. (2015) *Dual-Responsive Hydrogels for Direct-Write 3D Printing*, Macromolecules 48(18):6482-6488; L. A. Hockaday et al. (2012) *Rapid 3D printing of anatomically accurate and mechanically heterogeneous aortic valve hydrogel scaffolds*, Biofabrication 4(3)).

In addition, there are substantial challenges when attempting to apply extrusion-based 3D printing to soft tissue engineering. For example, various naturally derived polymers such as collagen/gelatin, alginate, fibrin, and hyaluronic acid are highly printable with minimal donor-site morbidity and immune response, but undergo rapid remodeling and collapse in vivo (A. Lode et al. (2016) *Additive manufacturing of collagen scaffolds by three-dimensional plotting of highly viscous dispersions*, Biofabrication 8:015015; L. E. Bertassoni et al. (2014) *Direct-write bioprinting of cell-laden methacrylated gelatin hydrogels*, Biofabrication 6:024105; J. Jia et al., (2014) *Engineering alginate as bioink for bioprinting*, Acta Biomater. 10:4323-4331; T. Zehnder et al. (2015) *Evaluation of an alginate-gelatine crosslinked hydrogel for bioplotting*, Biofabrication 7(2):025001; D. B. Kolesky et al. (2006) *Three-dimensional bioprinting of thick vascularized tissues*, Proc. Natl. Acad. Sci. USA 113:3179-3184; D. Petta et al. (2018) *3D bioprinting of a hyaluronan bioink through enzymatic-and visible light-crosslinking*, Biofabrication 10(4):044104; K. Hemmrich et al. (2008) *Autologous in vivo adipose tissue engineering in hyaluronan-based gels—a pilot study*, Surg. Res. 144:82-88; K. Okabe et al. (2009) *Injectable soft-tissue augmentation by tissue engineering and regenerative medicine with human mesenchymal stromal cells, platelet-rich plasma and hyaluronic acid scaffolds*, Cytotherapy 11(3): 307-316). Conversely, synthetic polymers such as polycaprolactone and poly(D,L)-lactide have a mechanical mismatch with the native soft tissue, an absence of surface ligands for cell attachment, and degradation products that negatively impact cellular metabolism and proliferation (F. Pati et al. (2015) *Biomimetic 3D tissue printing for soft tissue regeneration*, Biomaterials 62:164-175; M. P. Chhaya et al. (2015) *Sustained regeneration of high-volume adipose tissue for breast reconstruction using computer aided design and biomanufacturing*, Biomaterials 52:551-560; H. Im et al. (2018) *Skin Regeneration with a Scaffold of Predefined Shape and Bioactive Peptide Hydrogels*, Tissue Eng., Part A, 24: 1518-1530; B. Dhandayuthapani et al. (2011) *Polymeric Scaffolds in Tissue Engineering Application*: A Review, Int. J. Polym. Sci. Vol. 2011, 290602). Thus, conventional inks have failed to produce structures that adequately mimic soft tissue with long-term shape and size retention, mechanical stability, and host integration.

Accordingly, there is a need for improved ink formulations, fabrication methodologies, and soft tissue skin grafts that mimic the patient's own physical features (shape and mechanical properties), that foster the regeneration of a viable (and vascularized) skin layer, and/or that overcome some or all of the deficiencies noted above.

SUMMARY OF THE DISCLOSURE

The present invention relates to the fabrication of biomimetic soft tissue grafts via hybrid printing of degradable and non-degradable hydrogel materials, ink formulations for 3D printing grafts and implantable support devices, and custom-shaped grafts comprising a patient's own cells. Extrusion-based 3D printing is leveraged to produce superior soft tissue grafts that allow enhanced host integration and volume retention utilizing a novel dual ink 3D printing strategy that includes a non-biodegradable ink formulation and a biodegradable ink formulation. In accordance with the present disclosure, custom-shaped soft tissue grafts are fabricated via the precise placement of cells and matrix materials in an organized layer-by-layer manner that exhibits characteristics substantially similar to native tissue (see, e.g., Z. Rahman et al. (2018) *Additive Manufacturing with 3D Printing: Progress from Bench to Bedside*, AAPS J. 20:101).

Synthetic and natural hydrogel materials are utilized to create stable, biomimetic soft tissue constructs that exhibit superior characteristics as compared to conventional technologies. Customized scaffold structures or devices are 3D printed from hybrid ink formulations comprising a synthetic ink material (e.g., a polyether, a polyacrylamide, a polyvinyl, or a polyacrylate) and a biodegradable bioink. Suitable synthetic ink materials include, e.g., but are not limited to: poly(ethylene glycol) (PEG), poly(N-isopropylacrylamide), poly(vinyl alcohol), poly(acrylates), or mixtures thereof. Upon exposure to ultraviolet radiation or other chemical crosslinking agents, such synthetic polymers can bond to form non-degradable hydrogel polymeric networks. In addition, such synthetic polymers are advantageous due to their high water content and facile transport properties. Suitable bioink materials include, e.g., but are not limited to: natural, protein-based polymers (e.g., collagen, gelatin, silk fibroin, fibrin, elastin), polysaccharides (e.g., chitosan, hyaluronic acid, and alginate), or other biopolymers or modified biopolymers. Such natural materials are advantageous due to their inherent biological recognition through receptor-ligand interactions, cell-mediated proteolysis and remodeling, and low toxicity. In one implementation, a scaffold support structure is fabricated from hybrid ink formulations comprising a nonbiodegradable ink material comprising PEG and a degradable bioink material comprising a gelatin (e.g., gelatin methacrylate (GelMA)) bioink.

In accordance with the present disclosure, a hybrid construct is fabricated from a non-degradable synthetic ink and a biodegradable, cell-seeded bioink. In particular, implantable graft devices comprise: i) a biodegradable component fabricated from bioink seeded with a patient's own cells; and ii) a non-biodegradable synthetic supportive structure. Both the biodegradable and non-biodegradable materials are preferably hydrogels, so that the interior of the graft remains viable with sufficient nutrient diffusion/transport, and so that the mechanical properties uniformly mimic those of human soft tissue. A viable dermis is achieved containing fibroblasts with spindle-like morphology within the hybrid scaffold. A fully intact, curved epidermal layer containing keratinocytes with tight junctions and physiological stratification can be developed upon the surface of the hybrid scaffold to resemble the morphology of a complete skin graft. Thus, the epidermis is developed on the surface of the scaffold; only the dermis is within the hybrid scaffold interior.

In accordance with the present disclosure, an implantable scaffold device is provided that comprises a non-biodegradable support portion and a biodegradable dermal portion. In some embodiments, the scaffold is fabricated via three-dimensional (3D) printing, e.g., wherein the 3D printing is material extrusion 3D printing. In some embodiments, the support portion comprises a first hydrogel, and the dermal portion comprises a second hydrogel different than the first hydrogel.

In some implementations, the first hydrogel comprises a polymer material selected from the group consisting of a polyether, a polyacrylamide, a polyvinyl, or a polyacrylate. For example, the non-biodegradable support portion may be fabricated from a composition comprising poly(ethylene glycol), poly(N-isopropylacrylamide), poly(vinyl alcohol), a poly(acrylate), or mixtures thereof. One of skill in the art would appreciate, however, that other non-biodegradable polymer materials may be utilized for fabricating the support portion.

In some implementations, the dermal portion comprises a biopolymer. For example, the dermal portion may be fabricated from a composition comprising collagen, gelatin (e.g., gelatin methacrylate), silk fibroin, fibrin, elastin, chitosan, hyaluronic acid, alginate, or mixtures thereof. One of skill in the art would appreciate, however, that other biodegradable polymer materials may be utilized for fabricating the dermal portion.

In some embodiments, the support portion comprises PEG and the dermal portion comprises gelatin methacrylate. In some implementations, the dermal portion additionally comprises autologous cells of a subject. In some implementations, the dermal portion comprises a population of fibroblasts and/or a population of keratinocytes.

In some embodiments, the scaffold device additionally comprises an epidermal portion. In some implementations, the epidermal portion comprises cells, e.g., a population of keratinocytes. In some implementations, the epidermal portion comprises a therapeutic agent, e.g., such as an antibiotic, an anti-inflammatory, a proangiogenic and/or a growth hormone.

The present disclosure is also directed to a method of 3D printing an implantable scaffold device (e.g., such as a nipple-areola complex implant, or other implantable structure), comprising the step of coprinting a non-biodegradable support portion using a synthetic ink formulation and a biodegradable dermal portion using a biodegradable bioink formulation.

In some implementations, the synthetic ink formulation comprises a polymer material selected from the group consisting of a polyether, a polyacrylamide, a polyvinyl, a polyacrylate, and mixtures thereof. For example, in some implementations the synthetic ink formulation comprises a polymer selected from the group consisting of poly(ethylene glycol), poly(N-isopropylacrylamide), poly(vinyl alcohol), a poly(acrylate), and mixtures thereof. One of skill in the art would appreciate, however, that ink formulations comprising other non-biodegradable polymer materials may be utilized, as noted above. In some implementations, the synthetic ink formulation comprises a thickener, e.g., alginate or methylcellulose.

In some embodiments, the bioink formulation comprises a biopolymer. For example, in some implementations, the bioink formulation comprises a polymer selected from the group consisting of collagen, gelatin (e.g., gelatin methacrylate), silk fibroin, fibrin, elastin, chitosan, hyaluronic acid, and alginate. One of skill in the art would appreciate, however, that bioink formulations comprising other biodegradable polymer materials may be utilized, as noted above. In some implementations, the bioink formulation comprises a population of fibroblasts and/or a population of keratinocytes.

BRIEF DESCRIPTION OF THE DRAWINGS

The patent or application file contains at least one drawing/photograph executed in color. Copies of this patent or patent application publication with color drawing(s) will be provided by the Office upon request and payment of the necessary fee.

FIG. 6. Hybrid scaffolds of GelMA bioink encapsulating primary human dermal fibroblasts and PEG ink were fabricated with a 1-1 print pattern (Panel A). Live/Dead images were taken over the initial 2 weeks of culture (calcein AM: green cells=live, ethidium homodimer: red cells=dead) (Panels B-D). Percent live cells (Panel E) and DNA concentration (Panel F) were also quantified. N=3 and mean±standard deviation is depicted, $p<0.05$.

FIG. 8. Mechanical testing of various print patterns. Compression modulus test results are shown for various print patterns of PEG/methylcellulose and GelMA used to fabricate hybrid scaffolds (Panel A). Uniaxial compression testing was performed on hybrid scaffolds both before and after experiencing GelMA digestion via collagenase. Three difference print ratios (PEG:GelMA) were utilized to fabricate the hybrid nipple-areola scaffolds with methylcellulose thickened PEG; 1-1 ratio; 1-2 ratio; and 1-3 ratio, as well as a scaffold formed solely from GelMA ink. Animal tissue (pig teat) was used as a control (Panel B). Mean±standard deviation is depicted, $p<0.05$. Results depict that the addition of methylcellulose to the PEG ink helps hybrid scaffolds achieve mechanical properties comparable to those seen in vivo.

FIG. 12. Media diffusion. (Panel A) Media was evenly distributed using the bioreactor set providing for an inverted scaffold. After 24 hours diffusion period, the graft and nipple projection retained its shape and exhibited enhanced cell growth. (Panel B) In comparison, grafts cultured with the nipple projection extending upwardly resulted in a dehydrated and poorly shaped nipple projection indicating inadequate media diffusion for skin graft maturation.

FIG. 13. 3D Printed nipple-areola complex structured including vascular channels therethrough (shown by darker die material visible in the nipple projection area.

DETAILED DESCRIPTION OF EMBODIMENTS

The present disclosure relates to novel hybrid 3D printing techniques that capitalizes on the strengths of both non-biodegradable and biodegradable hydrogels to create biomimetic constructs with long-term shape and volume retention. Disclosed constructs are fabricated using multiple-component inks including a double network (DN) of a non-biodegradable polymer material and a biodegradable polymer material. Suitable non-biodegradable polymer materials include polyethers, polyacrylamides, polyvinyls, and polyacrylates. For example, the non-biodegradable polymer may be poly(ethylene glycol) (PEG), poly(N-isopropylacrylamide), poly(vinyl alcohol), a poly(acrylate), or mixtures thereof. Suitable biodegradable polymers include protein-based natural polymers (e.g., collagen, gelatin, silk fibroin, fibrin, elastin), polysaccharides (e.g., chitosan, hyaluronic acid, and alginate), and other biopolymers.

Figure 1:
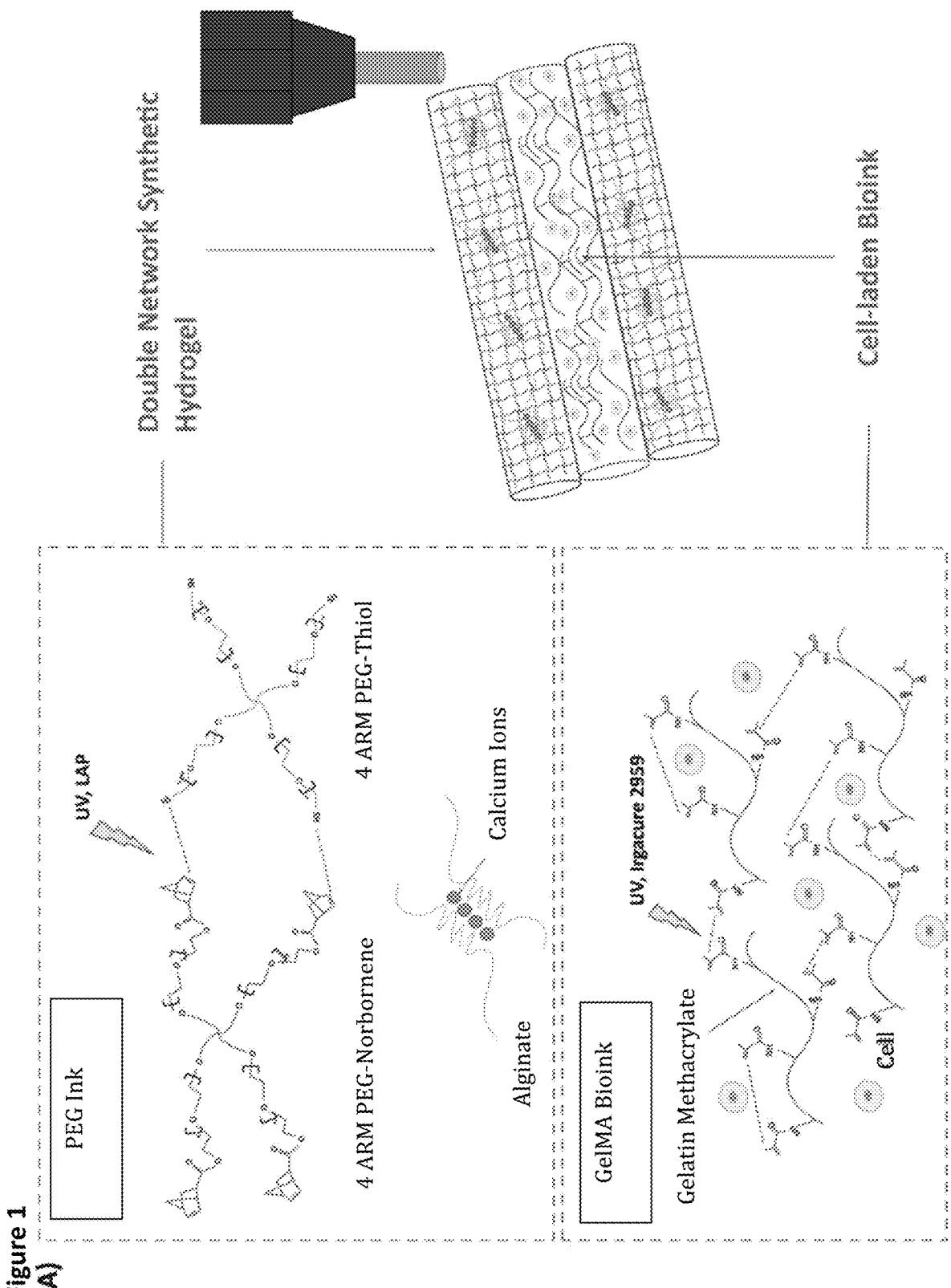
FIG. 1. Printed inks and hybrid scaffold. (Panel A) Four-arm PEG monomers functionalized with norbornene and thiol end groups react when photoinitiator LAP is present within the solution, as alginate ionically cross-links with itself with the presence of calcium ions; GelMA monomers mixed with cells and Irgacure 2959 results in a cross-linked cell-encapsulated bioink strand. (Panel B) Visual representation of alternating PEG and GelMA inks in 1-1 pattern to create a hybrid scaffold. Complex architectures can be created using this printing technique, such as (Panel C) human nose, (Panel D) ear, (Panel E) thyroid cartilage (commonly known as Adam's Apple), and a nipple-areola complex including GelMA digested construct (Panel F) and pre-digested construct (Panel G).
Figure 1:
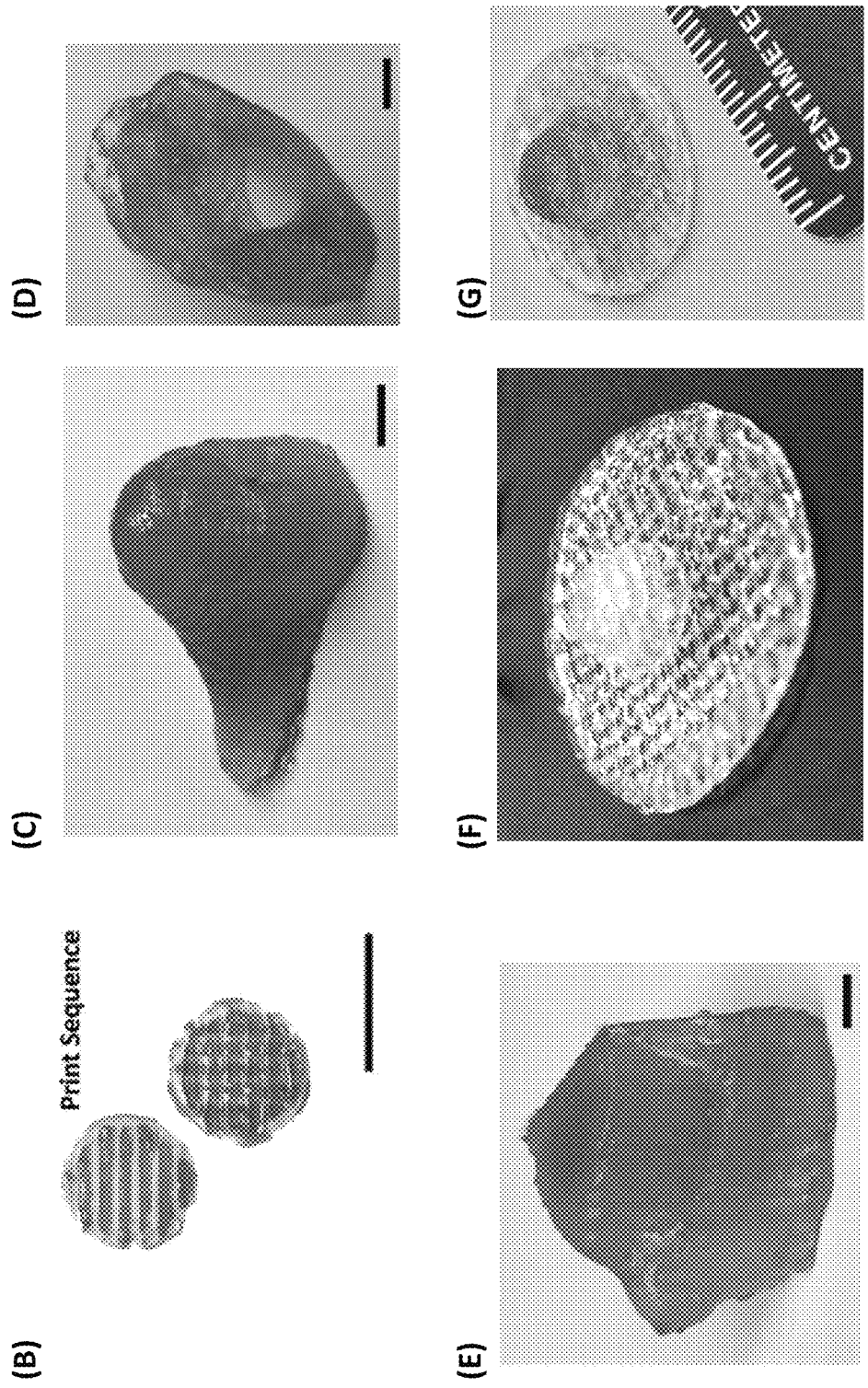

In a preferred embodiment, an implantable scaffold device is fabricated using multiple-component inks including: i) a double network (DN) of a non-biodegradable polymer material comprising PEG covalently linked with a naturally derived and physically cross-linked thickener (e.g., alginate or methylcellulose), and ii) a biodegradable cell-laden bioink of gelatin methacrylate (GelMA) (FIG. 1, Panel A). The DN ink acts as a physical support network that promotes cell growth, and provides a robust physical support necessary to retain long-term graft volume and shape. The cell-laden, biodegradable GelMA bioink provides a biological environment that stimulates tissue regeneration. In accordance with disclosed printing methods, precise layer-by-layer placement of hydrogel strands (FIG. 1, Panel B) is achieved that functionally complement each other and enable the construction of complex geometries (e.g., nose, ear, thyroid cartilage, nipple, etc.) (FIG. 1, Panels C-G).

Composite scaffold devices fabricated in accordance with the present disclosure were evaluated for their mechanical properties, shape retention, and cytotoxicity. Additionally, shape analysis techniques utilizing CloudCompare software were developed for assessing scaffold aesthetic properties. With this dynamic 3D bioprinting strategy, complex geometries with robust internal structures may be readily modulated by varying the print ratio of nondegradable to sacrificial strands. The versatility of this hybrid printing fabrication platform is suitable for fabricating a wide range of designs for multi-material regenerative implants, allowing for the production of shape-retaining scaffolds capable of regenerating skin in a desired configuration.

In accordance with disclosed embodiments, an in vitro, 3D printed custom-shaped skin graft composed of both a cell laden bioink (containing primary human dermal fibroblasts and/or keratinocytes) and a non-degradable backbone is fabricated in a desired and patient-specific configuration, e.g., in the shape of a nipple-areola complex specific to a particular patient. The nipple-areola complex implant disclosed herein provides a significant impact on the psychological healing of individual patients and tissue engineering advances in women's health. Prosthetic nipple implants formed in accordance with the present disclosure exhibits substantially less flattening compared to conventional procedures (e.g., SFS procedure). Moreover, the disclosed grafts may be readily applied to and further enhance current breast reconstruction techniques, such as silicone implantation. The disclosed techniques may be utilized for minimizing a patient's prominent mastectomy scars, providing an environment for regenerating the patient's own breast tissue, and providing an appearance that more closely mimics the look of the patient's natural organ.

The non-degradable material choice for the backbone of the implant is important for maintaining the complex shape of the nipple as the tissue matures once incorporated in vivo, as a degradable backbone would cause unwanted nipple flattening over time. Material compatibility was tested with co-printed scaffolds of a synthetic non-degradable ink and the bioink that were cultured for several days and tested in cell viability. Healthy cellular growth was demonstrated as measured by increasing DNA content throughout culture and fluorescent human dermal fibroblast images displaying healthy spindle-like spread morphology around the synthetic scaffolding. Internal architecture of the domed scaffold was greatly varied to investigate the benefits of interconnected bioink porosity, such as improved cell seeding and channels to guide cellular migration and tissue ingrowth, and variations of material print patterns, such as control over the desired tissue mechanical properties.

Mechanical integrity of the varying internal architectures was tested using an Dynamic Mechanical Analyzer (DMA) implementing compressive testing and corresponding young's moduli, ranging from 18.7±3.95 kPa to 2.94±0.921 kPa, and compared to properties in vivo for human skin (M. Pawlaczyk et al. (2013) *Age-dependent biomechanical properties of the skin*, Postepy Dermatol Alergol, 30(5):302-306). Formation of both dermis and epidermis using histological and immunohistochemical methods was validated, with a particular focus on evaluating cell morphology, and the expression of major skin proteins (collagen I and keratin). An optimized balance between synthetic materials for scaffold shape maintenance and degradable materials for tissue regeneration and reconstruction was achieved.

Internal PEG network: PEG ink exhibiting stiff mechanical properties acts as the structural support network for the implant. The PEG ink was co-printed with a degradable GelMA bioink in order to produce a scaffold with shape-retaining and soft tissue-like tactile properties. In preferred implementations, an ink was formulated utilizing thiol-ene click chemistry. The resulting strand material gels within seconds when exposed to UV light, a factor used in the disclosed printing process to intermittently crosslink layers, and is cytocompatible given the crosslinking of step-growth thiol-norbornene hydrogels is not oxygen-inhibited (B. D. Fairbanks et al. (2009) *A Versatile Synthetic Extracellular Matrix Mimic via Thiol-Norbornene Photopolymerization*, Advanced Materials 21(48):5005). The thiol-norbornene reaction can not only be initiated several orders of magnitude faster than the classic method of random chain-growth photopolymerization, but also results in a much more uniformly crosslinked gel since each monomer with a defined functionality serves as a single crosslinking point (C. C. Lin et al. (2015) *Thiol-Norbornene Photoclick Hydrogels for Tissue Engineering Applications*, J Appl Polym Sci. 132(8)). The degree of network heterogeneity is minimized when compared to random chain-growth polymerization, since in chain-polymerized gels there is an unfixed number of arms per crosslinking point due to the random nature of radical propagation and termination in chain-growth polymerization (K. Vats et al. (2017) *Nanoscale physicochemical properties of chain-and step-growth polymerized PEG hydrogels affect cell-material interactions*, J Biomed Mater Res A. 105(4): 1112-1122), which allows for a greater control when designing the swelling and mechanical properties of our ink. The synthetic ink disclosed herein allows for fine control over the structural properties of the scaffold, thus resulting in the development of a soft tissue equivalent (e.g., a nipple-areola complex) with physiologically relevant properties (e.g., shape and tactile properties).

Double Network Ink: Double network (DN) ink was synthesized by first dissolving 5% (w/v) four-arm PEG norbornene and 5% w/v four-arm PEG thiol in deionized water. Lithium phenyl-2,4,6-trimethylbenzoylphosphinate (LAP) with a 0.2% w/v ratio and alginate powder (Sigma-Aldrich, St. Louis, MO) with a w/v ratio varying from 1% to 5% (derived from brown algae (Sigma-Aldrich, St. Louis, MO) was added and thoroughly mixed. The ideal amount of alginate used for thickening the PEG solution was then tested by systematically extruding the various formulations through the printer cartridge.

Figure 2:
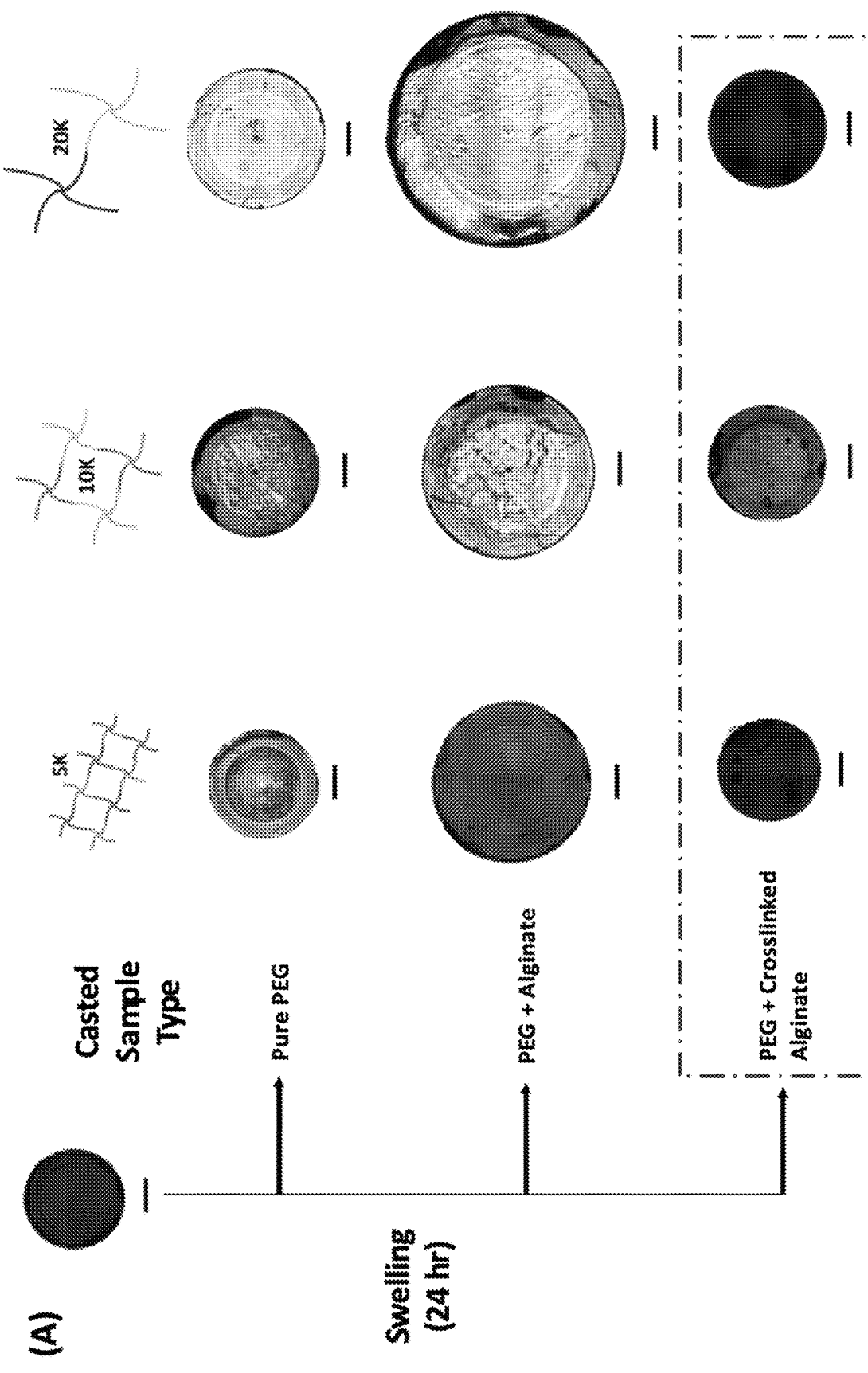
FIG. 2. Swelling characteristics. (Panel A) Ink formulations with varying PEG molecular weight (5 kDa, 10 kDa and 20 kDa) monomers where either i) a pure PEG cross-linked network, ii) added alginate for thickening purposes, and iii) a double network consisting of covalently cross-linked PEG and physically cross-linked alginate was formed. Bright field images revealed that the interpenetrating networks resulted in the least visual swelling (red box). (Panel B) Diameter percent increase, (Panel C) thickness percent increase, and (Panel D) mass percent increase (Panel E) mass swelling ratio were recorded. n=6 and mean±standard deviation is depicted, p<0.05.
Figure 2:
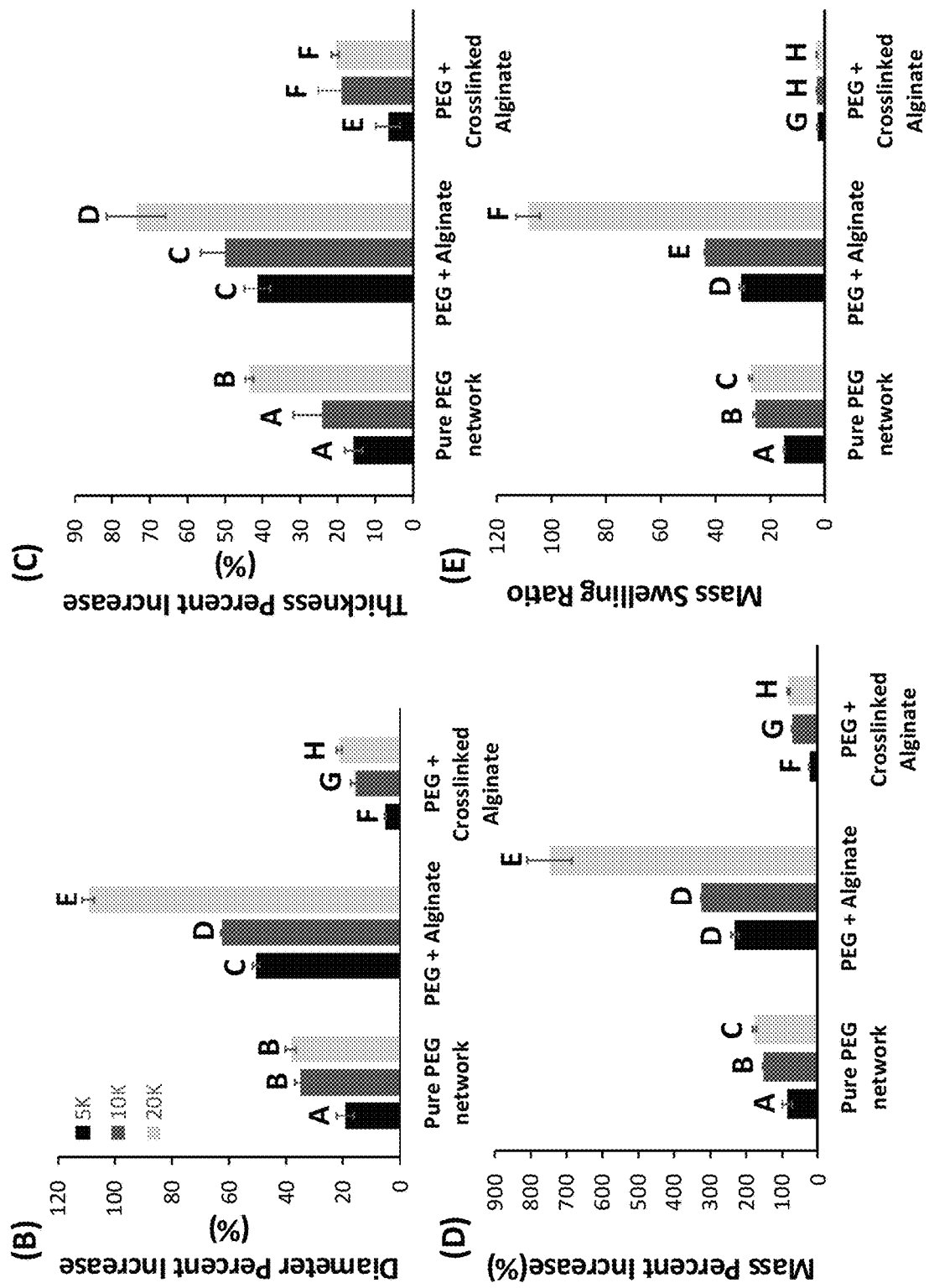

Swelling of DN Ink: For each ink formulation (5K, 10K, and 20K), solid discs with a 5 mm diameter and 2 mm thickness were casted using previously printed molds (FIG. 2, Panel A). Disc dimensions, wet/dry weight, and bright field images of each sample were taken before and after a 24 h incubation at 37° C. Percent increase measurements (in mass, thickness, and diameter) were calculated by dividing the difference of swollen versus unswollen measurements by the original unswollen value (FIG. 2, Panels B-D). Mass swelling ratio was similarly calculated by dividing the difference of the swollen and lyophilized material mass by the mass of the lyophilized material (FIG. 2, Panel E).

GelMA Bioink: GelMA was synthesized using similar methods as previously described (C. Y. Kuo et al. (2018) *Repair of Tympanic Membrane Perforations with Customized Bioprinted Ear Grafts Using Chinchilla Models*, Tissue Eng., Part A, 24:527-535). For printing, lyophilized GelMA was dissolved at 7% w/v in fibroblast media at 50° C. for 20 min. Irgacure 2959 (0.2% w/v) (BASF, Germany) was added at 50° C. for 15 min. Fibroblasts were then added to the GelMA at a concentration of $2 \times 10^6$ cells $mL^{-1}$ and homogenously mixed throughout the solution. The prepolymer solution was then loaded into a syringe barrel and allowed to equilibrate for 30 min at 23° C.

Hybrid Scaffold Fabrication: Complex architectures consisting of human nose, ear, thyroid cartilage, and nipple-areola-complex (adopted from 3D scans, GrabCAD) were printed in a 1-1 DN-GelMA pattern (FIG. 1, Panels C-F). Model scaffolds were sliced into layers with a slicing thickness equal to 80% (0.32 mm) of the needle size (0.4 mm) before printing. Each printed layer was exposed to UV light (5 mW $cm^{-2}$ intensity) for 5 s, and the final print was placed in a UV box (5 mW $cm^{-2}$) and exposed further for 6 min. For the remaining assays, 3D cylinder models with 5 mm diameter and 2 mm thickness were designed using SolidWorks (Waltham, MA). For the cytotoxicity assay (1-1 pattern), prints were immediately transferred to 6-well tissue culture plates and submerged in media, with media changes every 2 d for 2 weeks. Cylindrical scaffolds were printed with varying ratios of ink patterns (FIG. 3, Panel A; DN-GelMA: 1-0; 2-1; 1-1; 1-2; 1-3; and 0-1) for mechanical testing. Half of the produced scaffolds were exposed to collagenase IV (500 Units mL-1 (Worthington Biochemical Corp., Lakewood, NJ) to evaluate the DN's impact on the composite mechanical properties.

Figure 3:
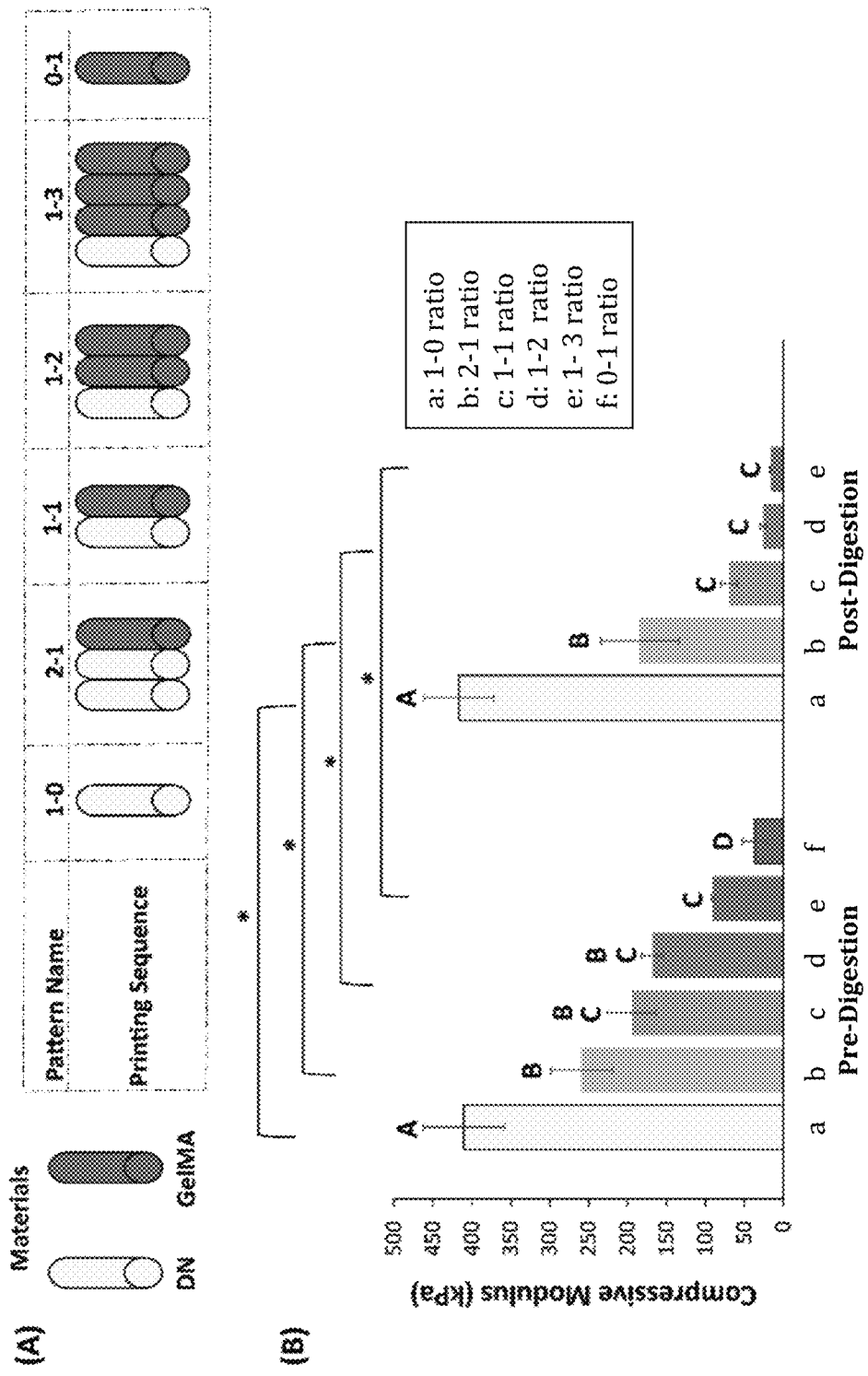
FIG. 3. Mechanical testing of various print patterns. (Panel A) Visual description of the various print patterns used to fabricate hybrid scaffolds. Uniaxial compression testing was performed on hybrid scaffolds both before and after experiencing GelMA digestion via collagenase IV. Mechanical properties, such as (Panel B) compressive modulus, (Panel C) fracture strength, and (Panel D) toughness were characterized to ensure hybrid scaffolds exhibited similar properties to soft tissue. n=5 and mean±standard deviation is depicted, p<0.05.
Figure 3:
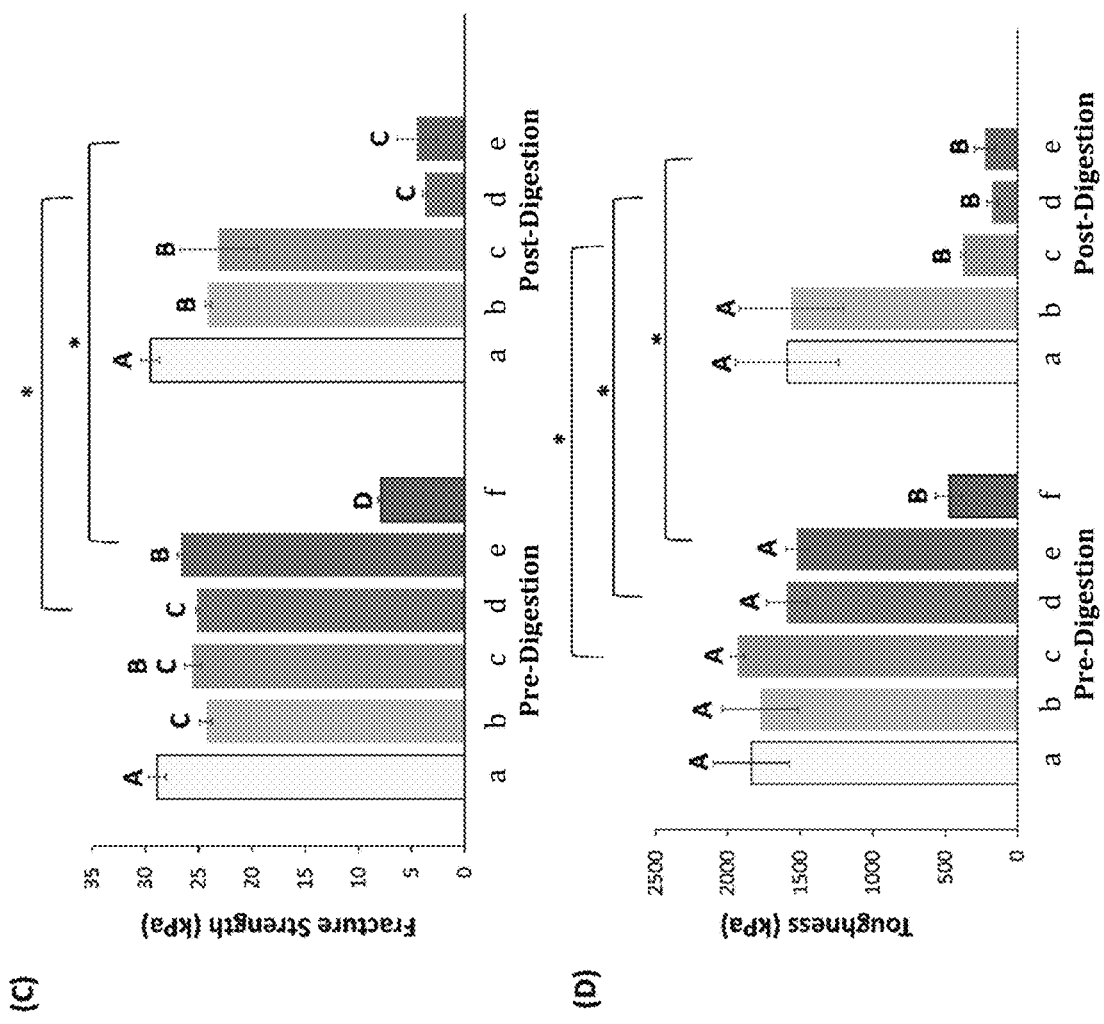

Mechanical Testing of Hybrid Scaffolds: Compression testing was performed on a Dynamic Mechanical Analyzer (DMA Q800, TA Instruments Corp., New Castle, DE) with a strain sweep (0-15%) and load 0.01 N at 1 Hz frequency (FIG. 3, Panel B). Elastic modulus for each sample was calculated by determining the slope of the linear region of the stress-strain curve (strain region of 3-5%). Fracture strength was recorded (force at which the hydrogel plastically yields) as well as toughness (area under the stress-strain curve) (FIG. 3, Panels C-D).

Figure 4:
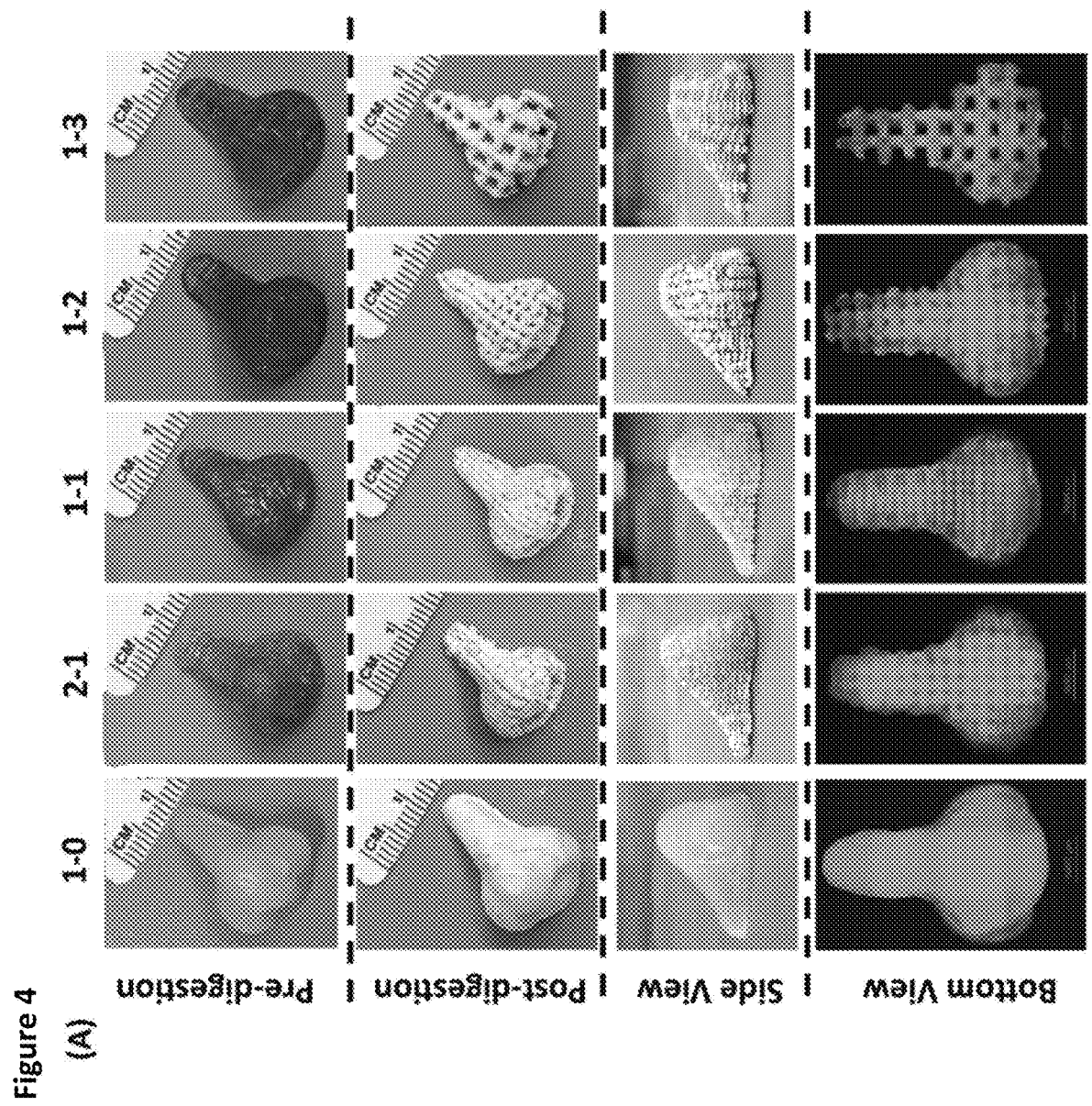
FIG. 4. Complex scaffold shape retention. (Panel A) Nose structures were 3D printed in various patterns of double network ink and GelMA and further subjected to collagenase IV digestion. (Panel B) Scaffold dimensions were recorded and compared to its original fabricated form, specifically (Panel C) width, length, and peak height were evaluated for ink ratio patterns: 1-0; 2-1; 1-1; 1-2 and 1-3. (Panel D) Magnitude of curvature was also calculated and recorded for each hybrid pattern. n=4 and mean±standard deviation is depicted, p<0.05.
Figure 4:
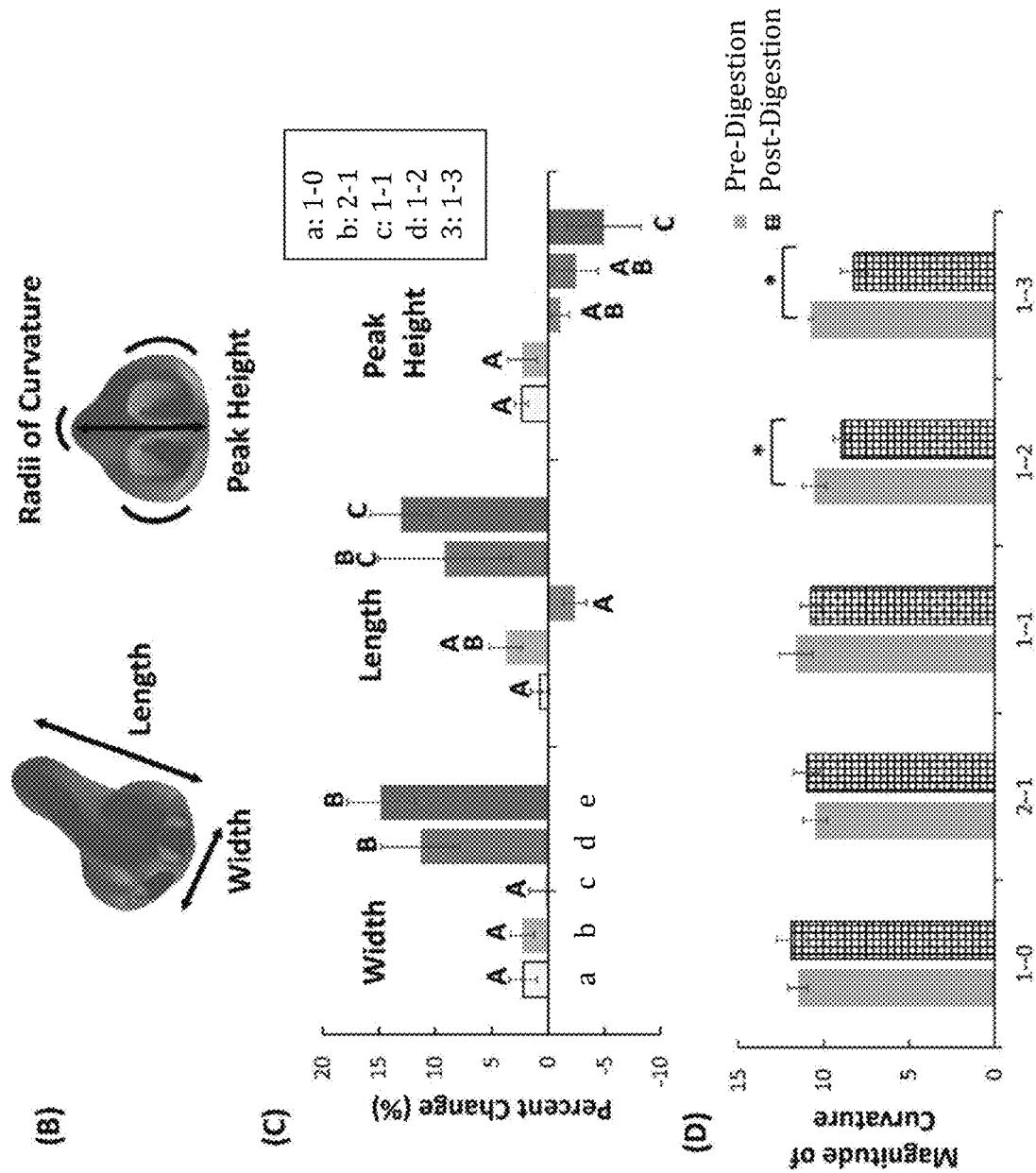

For purposes of further evaluation, nose-shaped scaffolds were printed in various ratios of ink patterns and further subjected to collagenase IV digestion (FIG. 4, Panel A, with five columns for each ink ratio, from left to right: 1-0; 2-1; 1-1; 1-2; 1-3; and 0-1). Scaffold dimensions were recorded and compared to its original fabricated form, specifically width, length, and peak height (FIG. 4, Panels B-C). Magnitude of curvature was also calculated and recorded for each hybrid pattern (FIG. 4, Panel D). n=4 and mean±standard deviation is depicted, p<0.05.

Point Cloud Generation: The ROMER Absolute Arm (Hexagon) was used to generate point clouds containing high geometric detail of the scanned surface. Scaffolds were sprayed with water soluble paint prior to scanning for greater ease in detecting surfaces. The noses were sequentially scanned at multiple angles and the surfaces were selected using the software's editing brush tool. After the total region of interest was created, a volume was generated and exported as a stereolithography (STL) file.

Surface Alignment: STL files of the same sample (both pre- and post-digestion scans) were imported into the open-source software MeshLab (Visual Computing Lab—ISTI CNR). With this software, the alignment tools ("point-based alignment," "process tool alignment") were used by selecting four possible points along the base face of each model (D. Aiger et al. (2008) *4-points congruent sets for robust pairwise surface registration*, ACM Trans. Graphics 27:85).

Figure 5:
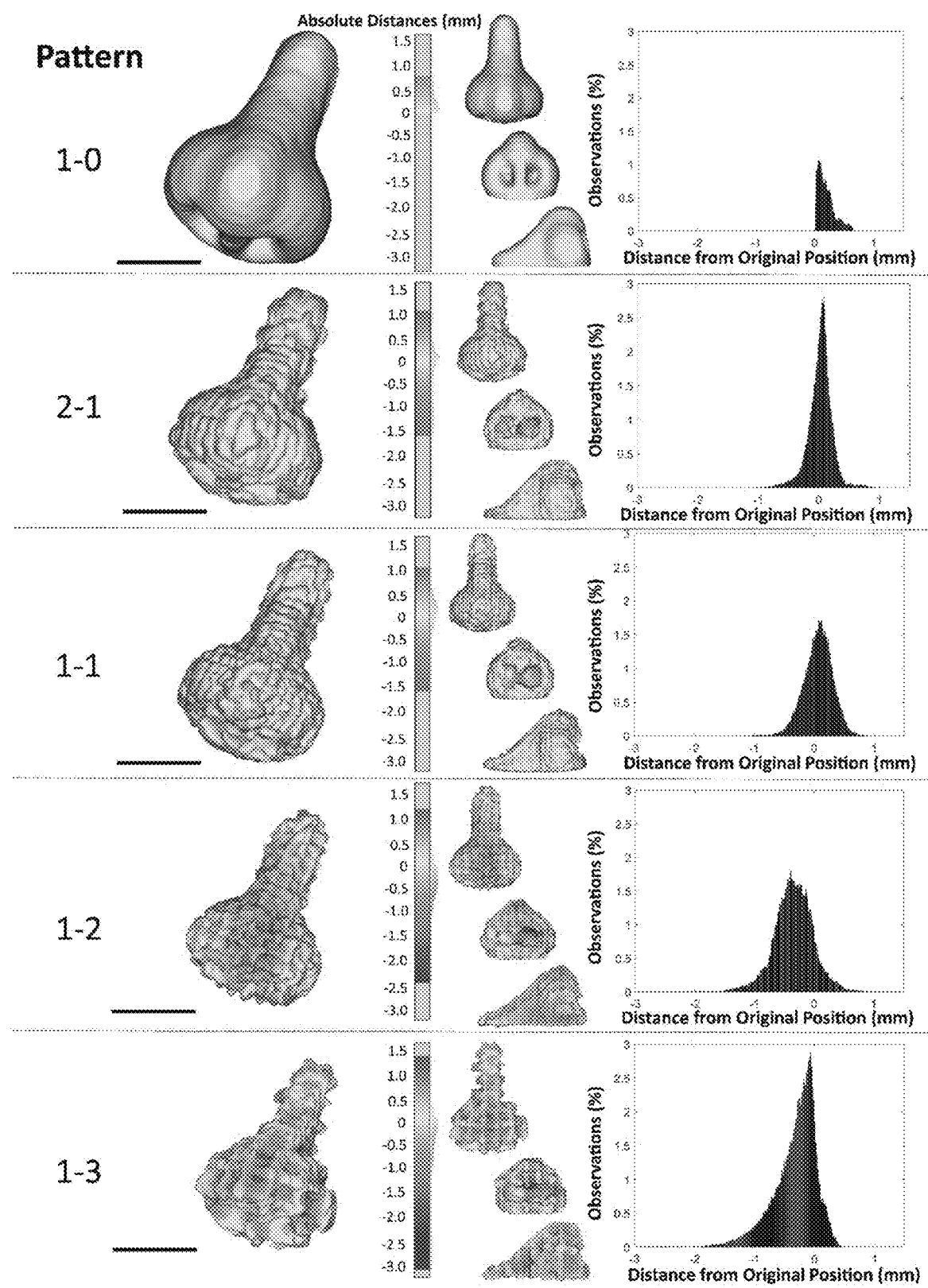
FIG. 5. Color maps displaying point cloud comparisons. Hybrid nose prints were 3D scanned with a Hexagon ROMER Absolute Arm both before and after GelMA digestion, such that finite element meshes could be produced and compared. Color maps display deviations of the digested scaffold to its original form, where red/orange designates positive deviations (swelling) and green/blue designates negative deviations (shrinkage). Histograms displayed on the right graphically show the percentage of mesh points that deviated from their initial positions. Scale bar displays 8 mm.

Cloud Comparison: The two repositioned STL meshes for each nose pattern were uploaded into the CloudCompare software and point cloud comparison was performed by selecting the predigestion mesh as the reference and the postdigestion mesh as the compared object. A color map was generated, which calculated the distance of points in the compared cloud to the nearest point in the reference predigestion cloud (FIG. 5).

Statistical Analysis: Data were analyzed using single factor analysis of variance (ANOVA) followed by Tukey's Multiple Comparison Test assuming normal data distribution with a confidence of 95% (p<0.05).

Double Network Support Structure

To begin, four-arm thiol-ene PEG hydrogels were chosen due to this system's predictable swelling characteristics, low toxicity, inertness, and resistance to common enzymes (H. Shin et al. (2011) *Cell-adhesive and mechanically tunable glucose-based biodegradable hydrogels*, Acta Biomater. 7:106-114). Because this solution exhibits low viscosity at low monomer concentrations, it is not readily loaded into a cartridge and printed alone; this solution is not self-supporting for layer-by-layer fabrication and should either be made very viscous by increasing PEG content or by including a thickener.

Alginate was initially selected as a thickener for the PEG ink solution since it has been shown to be an effective agent in creating extrudable hydrogels and can provide the opportunity for a second physically cross-linked interpenetrating network when subjected to calcium ions (S. Hong et al. (2015) *3D Printing of Highly Stretchable and Tough Hydrogels into Complex, Cellularized Structures*, Adv Mater. 27:4035-4040; Y. Jin et al. (2017) *Self-Supporting Nanoclay as Internal Scaffold Material for Direct Printing of Soft Hydrogel Composite Structures in Air*, ACS Appl Mater Interfaces 9:17456-17465). Thus, in the double network (DN) ink, there are two intertwining polymeric networks that are formed. The PEG 4 arm monomers crosslink covalently together with thiol-ene click chemistry. The alginate ionically bonds with itself with the help of calcium ions. These intertwined networks allow the material to be extremely stiff and strong, thereby providing adequate mechanical support for retaining the desired shape of the graft. It was found that an alginate concentration of 4% (w/v) produced an ideal filament when mixed with a 10% four-arm PEG solution, and this composition was further investigated for its swelling, mechanical properties, cell viability, and shape retention properties.

The thiol-ene chemistry provides an added advantage of high cross-linking speed when exposed to UV light, a factor used in our printing process to intermittently cross-link layers, and its cytocompatibility given the cross-linking of step-growth thiol-norbornene hydrogels is not oxygen-inhibited (C. Y. Liaw et al. (2018) *Engineering 3D Hydrogels for Personalized In vitro Human Tissue Models*, Adv Healthcare Mater. 7:1701165; B. D. Fairbanks et al. (2009) *A Versatile Synthetic Extracellular Matrix Mimic A via Thiol-Norbornene Photopolymerization*, Adv Mater. 21:5005-5010). The thiol-norbornene reaction can not only be initiated several orders of magnitude faster than the classic method of random chain-growth photopolymerization, but also results in a much more uniformly cross-linked gel since each monomer with a defined functionality serves as a single cross-linking point (C. C. Lin et al. (2015) *Thiol-norbornene photo-click hydrogels for tissue engineering applications*, J Appl Polym Sci. 132:41563). The degree of network heterogeneity is also minimized when compared to random chain-growth polymerization, since chain-polymerized gels contain an unfixed number of arms per cross-linking point due to the random nature of the reaction of radical propagation and termination (K. Vats et al. (2017) *Nanoscale physicochemical properties of chain-and step-growth polymerized PEG hydrogels affect cell-material interactions*, J Biomed Mater Res A. 105:1112-1122).

Thus, the thiol-ene chemistry allows for a greater control when designing the swelling and mechanical properties of the disclosed ink. To test the material's swelling properties, PEG hydrogels composed of either 5 k, 10 k, or 20 k Da monomers were first casted into discs to characterize the amount of swelling in excess water (FIG. 2, Panels A-D). Hydrogels composed of higher molecular weight monomer experienced more swelling when mass was held constant as observed in previous studies. For example, previous literature has shown poly(ethylene glycol) hydrogels swell greatly under physiological conditions and often become undesirably weak or brittle after swelling, which limits their applications (Y. Zhang et al. (2017) *High-water-content and resilient PEG-containing hydrogels with low fibrotic response*, Acta Biomater. 53:100-108). Mass swelling ratios are reported in 20-100 range, nearly tripling the hydrogel's originally casted size (C. C. Lin et al. (2015) *Thiol-norbornene photo-click hydrogels for tissue engineering applications*, J Appl Polym Sci. 132:41563; J. S. Temenoff et al. (2002) *Effect of poly(ethylene glycol) molecular weight on tensile and swelling properties of oligo(poly(ethylene glycol) fumarate) hydrogels for cartilage tissue engineering*, J Biomed Mater Res. 59:429-437).

In disclosed experiments, the smallest molecular weight monomer (5 k) pure polymer network originally had the smallest swelling ratio of 14.8±2.4. However, the addition of alginate to any of the ink formulations for printing purposes inhibited perfect PEG cross-link formation, which ultimately caused the once favorable 5 k swelling ratio to dramatically increase (FIG. 2, Panel E). While the higher molecular weight inks can be printed, significant hydrogel swelling and scaffold disfigurement make these ink formulations suboptimal as an engineered soft tissue replacement. When the alginate thickener was ionically cross-linked with calcium ions (after photopolymerization of the thiol-ene network), the swelling was significantly reduced due to the restriction of the interpenetrating secondary polymeric network.

Though double network chemistry is known to create extremely strong hydrogels able to withstand significant stress with minimal distortion, they have only been created with cytotoxic materials previously in literature (polyacrylamide) (S. Liu & L. Li (2017) *Ultrastretchable and Self-Healing Double-Network Hydrogel for 3D Printing and Strain Sensor*, ACS Appl Mater Interfaces 9:26429-26437; F. Yang et al. (2017) *3D Printing of a Double Network Hydrogel with a Compression Strength and Elastic Modulus Greater than those of Cartilage*, ACS Biomater Sci Eng. 3:863-869). Alginate was initially selected (and later methylcellulose for some applications, discussed further below) as both the ink thickener and the secondary polymeric network as it is cell-friendly and has been dependably used for 3D printing practices (T. Zehnder et al. (2015) *Evaluation of an alginate-gelatine crosslinked hydrogel for bioplotting*, Biofabrication 7(2):025001; S. Hong et al. (2015) *3D Printing of Highly Stretchable and Tough Hydrogels into Complex, Cellularized Structures*, Adv Mater. 27:4035-4040; Y. Jin et al. (2017) *Self-Supporting Nanoclay as Internal Scaffold Material for Direct Printing of Soft Hydrogel Composite Structures in Air*, ACS Appl Mater Interfaces 9:17456-17465).

Overall, alginate physical cross-linking prevented swelling by 32±0.2% in the 5 k ink, 53±1% in the 10 k ink, and 208±0.1% in the 20 k ink (FIG. 2, Panel D). The 5 k ink swelled the least when alginate ionic cross-linking was introduced (mass swelling ratio of 2.4±0.1), with casted disc samples experiencing 5±0.2% increase in diameter, 6±3% in thickness, and 23±1% in mass. The limited swelling of the 5 k ink made it an ideal candidate for soft tissue printing, and therefore was further evaluated for cytotoxicity and mechanical properties when co-printed in various patterns with GelMA.

Hybrid Printing

GelMA is chosen for its resemblance to native extracellular matrix, and offers significant advantages such as its case in printability, UV photopolymerization, and natural cell binding motifs (C. Y. Kuo et al. (2018) *Repair of Tympanic Membrane Perforations with Customized Bioprinted Ear Grafts Using Chinchilla Models*, Tissue Eng Part A. 24:527-535; C. Y. Kuo et al. (2019) *Trophoblast-endothelium signaling involves angiogenesis and apoptosis in a dynamic bioprinted placenta model*, Biotechnol Bioeng 116:181-192; N. Arumugasaamy et al. (2019) *In vitro Models for Studying Transport Across Epithelial Tissue Barriers*, Ann Biomed Eng. 47:1-21; N. Arumugasaamy et al., (2018) *Biomimetic placenta-fetus model demonstrating maternal fetal transmission and fetal neural toxicity of zika virus*, Ann Biomed Eng. 46:1963-1974). GelMA is widely utilized in medical applications as a tunable biomaterial whose composition (weight percentage) and cross-linking degree (UV exposure, photoinitiator concentration, and degree of methacrylation) can be customized to match its rate in degradation to the regenerated tissue it is replacing (Y. Wang et al. (2018) *Development of a Photo-Crosslinking, Biodegradable GelMA/PEGDA Hydrogel for Guided Bone Regeneration Materials*, Materials 11(8), E1345; J. R. Choi et al. (2019) *Recent advances in photo-crosslinkable hydrogels for biomedical applications*, BioTechniques 66:40-53; F. El Hajj et al., *Nanosilver Loaded GelMA Hydrogel for Antimicrobial Coating of Biomedical Implants*, 2015 International Conference on Advances in Biomedical Engineering (Icabme), 189-192 (2015); S. A. Ovadia et al. (2017) *Variation in Classification of Infection A Systematic Review of Recent Plastic Surgery Literature*, Annals of Plastic Surgery 78:587-599).

By strategically co-printing GelMA and the DN inks, our hybrid constructs can be readily tailored in both stiffness and degradation rate by varying the ratio of each ink in the print (FIG. 3). Soft tissue engineering requires matching of mechanical properties to the native tissue, otherwise detrimental effects to the tissue aesthetics can occur. The compressive moduli, toughness, and fracture strength were characterized for various print patterns of DN ink and GelMA bioink (FIG. 3, Panels A-D). Patterns of DN-GelMA varied from 1-0 (no tissue regenerative capacity, control) down to 0-1 (completely degradable GelMA, control) (FIG. 3, Panel A).

Since the GelMA network can degrade by collagenase, a naturally occurring enzyme in the body, the long-term mechanical properties of the composite scaffold are mainly dictated by the presence of the DN ink's two tightly crosslinked, interpenetrating polymeric networks. Therefore, the aforementioned mechanical properties of the hydrogel were characterized before and after exposure to collagenase IV (500 Units mL$^{-1}$) overnight. Under uniaxial compression, the composite hydrogels are elastic within 15% strain with moduli scaling a fourfold variation in stiffness, dependent on DN ink presence—a range congruent with the stiffness values of soft tissue (FIG. 3, Panel B), e.g., tendons/ligaments (500 kPa) to adipose fat (10 kPa) compressive moduli values (J. T. Iivarinen et al. (2014) *Experimental and numerical analysis of soft tissue stiffness measurement using manual indentation device—significance of indentation geometry and soft tissue thickness*, Skin Res Technol. 20:347-354; J. Töyräs et al. (2001) *Estimation of the Young's modulus of articular cartilage using an arthroscopic indentation instrument and ultrasonic measurement of tissue thickness*, J Biomech. 34:251-256; K. Arda et al. (2011) *Quantitative assessment of normal soft-tissue elasticity using shear-wave ultrasound elastography*, Am J Roentgenol. 197:532-536). Decreasing the double network fraction from the highest 1-0 ratio pattern to the lowest 1-3 DN-GelMA ratio pattern manifested a 74.5% decline in modulus. Printing GelMA alone resulted in a significantly less stiff scaffold (36.8±15.6 kPa), revealing that the coprint benefits from the incorporation of the DN ink for scaffold reinforcement.

Scaffold toughness and fracture strength are important mechanical properties that display the scaffold's ability to maintain shape while under compressive forces during tissue remodeling and implant healing. Both toughness and fracture strength remained high in all patterns before exposure to collagenase IV (1517.8-1836.3, 26.7-28.9 kPa respectively) (FIG. 3, Panels C-D). Post-digestion analysis similarly revealed that toughness and fracture strength most closely resembled the dominant matrix of the hybrid's material makeup. Together, the data show that the hybrid printing strategy is suitable for producing novel tissue constructs with controllable degradation rates, while simultaneously retaining the desired mechanical properties after in vivo incorporation.

Scaffold Aesthetic Properties Mapped with CloudCompare

In addition to maintaining similar mechanical properties to native soft tissue, shape retention is importance for ensuring long-term success of the soft tissue reconstruction. To this end, a model of an adult human nose was designed and scaled down to ⅓ of the average physiological size and printed with the hybrid inks (FIG. 4, Panel A). Again, the alternating patterns of DN ink to sacrificial GelMA bioink were used to print the complex nose shapes, and the scaffolds were 3D scanned with a Hexagon ROMER Absolute Arm both before and after digestion to determine variations in scaffold surface and shape.

Iconic characteristics of the scaffold (width, length, height, and curvature) (FIG. 4, Panels B-D) were measured from each surface scan. Across all patterns, a high degree of shape retention was observed with the highest deviation of 14.9±3.0% change in width, 13.0±2.7% change in length, and 4.9±3.3% change in height for the 1-3 pattern. Referring to FIG. 4, Panel C, data for each ratio pattern are shown graphically, with bars for each of the width, length and peak height of ink ratios, from left to right: 1-0, 2-1, 1-1, 1-2 and 1-3 (as shown for width). Significant changes in scaffold curvature was only displayed in the 1-2 and 1-3 print patterns by 15.0±4.8% and 23.3±8.3% respectively when compared to predigestive values. As the GelMA content increased, the peak height of the scaffold decreased post digestion, which resulted in subsequent decreases in scaffold curvature and increases in scaffold width and length.

The development of the printing techniques disclosed herein demanded the development of unique approaches of qualitatively assessing scaffold shape maintenance. The application of finite element mesh analysis via a 3D evaluation software CloudCompare allows both quantitative and qualitative characterization of shape deviations with such high detail that has not yet been visualized in the Tissue Engineering field. Thus, heat map analysis was performed where the surface mesh data sets were superimposed on each other for pairwise comparisons (MeshLab), and deviations between the pre- and post-digested scans were determined using CloudCompare (FIG. 5).

The data holistically show the DN ink's ability to dictate scaffold shape during degradative remodeling processes. Color maps illustrate spectra of yellow (indicating the standards of a perfect match) and red and blue colors (both indicating the lack of coincidence) depending on the DN-GelMA pattern used. The distribution of the points in relation to the distance from the referenced predigested surface can be visualized on the right side of these maps. Together, the color maps and graphic data displayed (FIG. 5) show a gradient in shape maintenance depending on the pattern used during scaffold fabrication. In agreement with the above-mentioned results, the control pattern 1-0 DN-GelMA displayed the best ability to maintain the complex shape of the nose post exposure to collagenase IV, as this scaffold did not experience any degradation. This mirrors the mechanical results shown (FIG. 3) as an increase in modulus is predicted to be from this pattern's slight swelling. Patterns 2-1 and 1-1 similarly swelled; this is believed to have occurred once the constricting GelMA strands dissolved post collagenase IV digestion and PEG strands were able to relax and swell. Pattern 1-2 displayed adequate ability in preserving the nose shape when compared to its original printed structure, with <1 mm deviation. Lastly, pattern 1-3 showed the least in ability to maintain shape, equivalent to 2 mm deviation from its original shape.

Taken together, the results indicate that the double network hydrogel has a gradient effect on dictating scaffold shape during degradative remodeling processes, allowing the ability to tailor each fabricated scaffold as desired for its intended application. However, overall scaffold shape was maintained for all patterns examined. Consequently, an effective degree of the nondegradable DN ink can be chosen to tailor the desired mechanical properties of the scaffold, such as delicate fat adipose tissue or stiffer muscular tissue, with promising long-term results.

Cytotoxicity Testing

To test the cytotoxicity of the DN ink, GelMA bioink was seeded with primary adult human dermal fibroblasts (2 million cells mL$^{-1}$ concentration) and extruded alongside DN ink in a two-layered disc print (FIG. 6, Panel A, 1-1 DN-GelMA pattern) to study the effect of PEG presence on cell viability. Discs consisting merely of GelMA and cells were also fabricated as a control to compare the effect of PEG material presence. Samples were stained with Calcein AM and Ethidium Homodimer on days 0, 7, and 14 of culture, imaged, and later digested for DNA quantification. Across all days, cell viability ranged from 87±5% (day 0) down to 72±8% (day 14) (FIG. 6, Panel E), which represents a high and very acceptable range for bioprinted constructs (K. Dubbin et al. (2017) Quantitative criteria to benchmark new and existing bio-inks for cell compatibility, Biofabrication 9(4):044102).

Quantitative DNA concentration assay mirrored these results (FIG. 6, Panel F), with day 7 containing 0.33±0.1 ratio and day 14 exhibiting 0.55±0.2 ratio in normalized DNA concentration when compared to day 0 values, demonstrating cell proliferation over time. In addition, the fibroblasts displayed a healthy morphology by spreading throughout culture within the prints. Day 0 images (FIG. 6, Panel B) portray rounded cell morphology, due to the recent encapsulation of the cells into a new environment as well as some pressure during the printing process. However, as shown by images at days 7 and 14 (FIG. 6, Panels C-D), the average cell spreading area gradually increased. These results indicate that the current coprinting method of the DN ink and GelMA bioink supports viable cell culture over extended periods of time. Because the DN ink's presence is shown to not have detrimental effects on cell viability, similar positive cell responses for other print patterns are expected.

Furthermore, the bioink allows for local remodeling by the cells, an important characteristic for scaffold-host integration and tissue ingrowth upon implantation in vivo. Overall, the high biocompatibility and low cytotoxicity of the complementary DN-GelMA hybrid inks exhibit tremendous potential as an effective strategy for the repair and replacement of native soft tissue with long-term stability and integration. Additionally, the readily modified chemistries of GelMA and PEG can be utilized to sequester desired growth factors (e.g., proangiogenic, anti-inflammatory, etc.) to further improve the functionality of the 3D printed grafts (B. P. Mahadik et al. (2015) *The use of covalently immobilized stem cell factor to selectively affect hematopoietic stem cell activity within a gelatin hydrogel*, Biomaterials 67:297-307; J. R. Krieger et al. (2016) *Spatially localized recruitment of anti-inflammatory monocytes by SDF-1α-releasing hydrogels enhances microvascular network remodeling*, Biomaterials 77:280-290).

Additional characteristics and features of the present disclosure will be further understood through reference to the following additional example of nipple-areola complex skin graft fabricated in accordance with the present disclosure, which is provided by way of further illustration and not intended to be limiting of the present disclosure.

Nipple-Areola Complex Skin Graft: A robust skin graft was fabricated in the shape of a nipple-areola complex via 3D printing, which comprises both a cell-laden hydrogel and a non-degradable macroporous backbone or support hydrogel. Incorporation of the permanent support portion allows the complex shape of the nipple to be maintained while the skin regenerates, thereby reducing the likelihood for subsequent surgical interventions, a key drawback of current reconstruction procedures.

A nipple prosthetic implant was fabricated as a hybrid 3D print comprising both a reinforced mechanical scaffold or backbone and the presence of patient or host cells. In some implementations, the implant comprises a dermal compartment and a non-biodegradable backbone. The dermal compartment is 3D printed utilizing a bioink that houses dermal fibroblast cells for skin regeneration. The backbone is 3D printed utilizing a synthetic ink that physically supports the implant and retains the nipple shape in vivo. As the skin graft grows in vitro, an epidermal barrier or compartment may be added, which comprises hand-seeded epidermal keratinocyte cells for the skin graft. The implant models regenerative skin grafts utilized for burn victims (including a stratified epidermis and dermis with collagen fibers.

The synthetic, nondegradable skeletal network provides the physical support necessary to retain the graft's initial fabricated form, while the incorporation of a cell-laden degradable bioink provides the biological environment that stimulates skin regeneration. As shown by the disclosed data, material properties of the PEG ink were characterized, both alone and when co-printed with GelMA bioink. The ability of the ink formulations to structurally support the shape of hybrid prints was demonstrated. Primary skin cells were incorporated into the GelMA bioink and a nipple-areola construct was fabricated and assessed in vitro for skin formation. The implant was also evaluated for its skin and vascular regenerative capacity in vivo when placed subcutaneously in an animal model.

Anatomically shaped nipple-areola implants were designed and fabricated via the disclosed 3D printing techniques. In particular, co-printed nipple areola skin graft constructs composed of biodegradable cell-laden bioink and non-biodegradable synthetic PEG were 3D printed ((FIG. 1, Panels F-G). The 3D printing formulations and implant printed therefrom demonstrates material compatibility with human dermal fibroblasts for sustained cell proliferation and physiological skin protein expression. As demonstrated by the data, the scaffold implant exhibits robust mechanical properties comparable to those seen in vivo, as well as robust shape maintenance properties necessary for skin graft growth in vivo.

Figure 7:
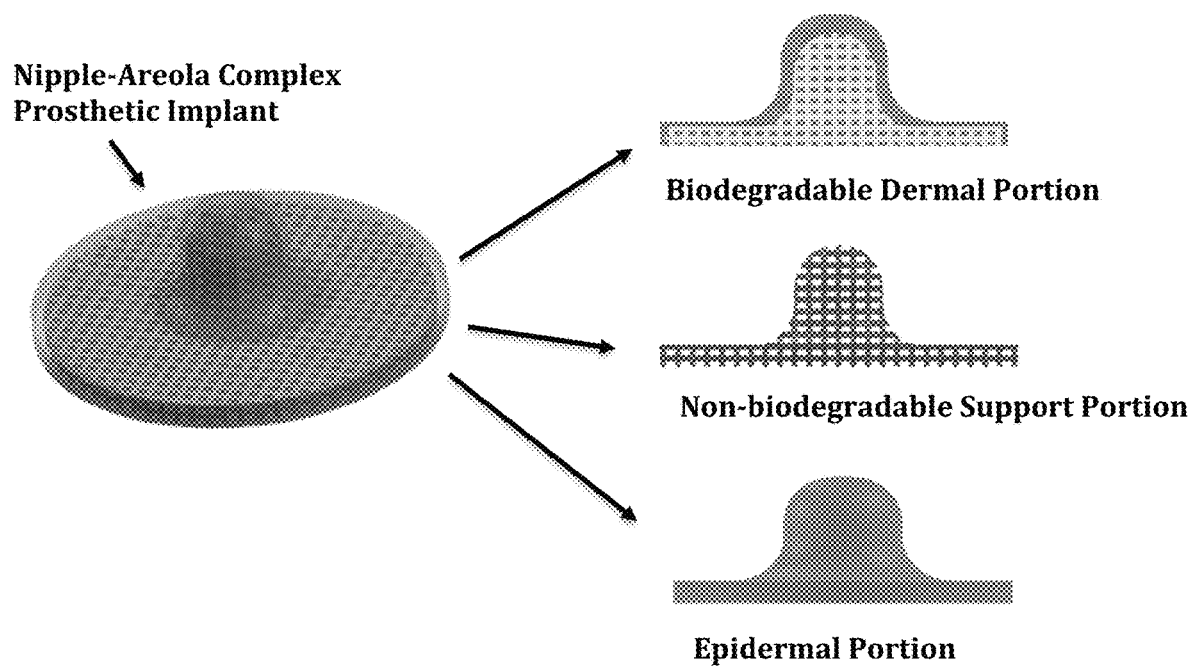
FIG. 7. Design components of nipple-areola reconstructive implant. Three major parts depicted above comprise the layers of the implant, where the bottom layer contains the natural, biodegradable bioink seeded with autologous dermal fibroblasts, middle layer contains the synthetic, non-degradable scaffold support structure, and upper layer contains the autologous epidermal keratinocytes. The entire scaffold works as a single unit to regenerate skin into a desired complex form (in this application, the nipple-areola complex is chosen). All three parts may be 3D printed, e.g., using an EnvisionTEC 3D-Bioplotter (3HTi, LLC; Mt. Laurel, NJ).

The implant includes a biodegradable dermal compartment, a non-biodegradable shell or backbone, and optionally a biodegradable epidermal compartment (FIG. 7). The biodegradable dermal compartment is formed from a bioink (preferably GelMA) that houses dermal fibroblast cells (cultured in vitro) for skin regeneration after implantation, and thus aids in the patient's incorporation of the implant as the biodegradable dermal compartment degrades while skin tissue regenerates. The non-biodegradable backbone is formed from a synthetic ink, preferably PEG as discussed above (or, e.g., medical grade silicone, or medical grade epoxy resin) that physically supports the implant and retains the nipple shape thereof in vivo.

The biodegradable dermal compartment and the non-biodegradable backbone are simultaneously fabricated using 3D printing, e.g., via extrusion-based pneumatic deposition of the two hydrogels using a 3D Bioplotter (EnvisionTEC, Gladbeck, Germany). 3D printing allows for customization of the implant (e.g., nipple size and height, areola size and height) for a particular patient. As described above, the implant is 3D printed with two inks simultaneously: i) a bioink comprising GelMA; and ii) a synthetic ink comprising PEG (FIG. 1, Panel A). In one implementation, alginate is used as a PEG ink thickener. Polymer length and concentration of each component were optimized by performing swelling tests (FIG. 2, Panel A). Ionically crosslinking the alginate with calcium ions reduced material swelling significantly—an important feature when 3D printing the ink formulation. Quantitative results indicated the ideal ink formulation as the 5 k PEG monomer molecular weight with ionically crosslinked thickener (FIG. 2, Panels B-E).

In another implementation, methylcellulose was added to the PEG ink solution as a thickener (in place of alginate) for extrusion printing. The resulting PEG/methylcellulose ink was found to better match the mechanical properties of native nipple tissue. In addition, the hydrophobic chain interaction and entanglement of the methylcellulose with PEG resulted in an extremely stable polymer network that did not need to be ionically crosslinked.

Compression testing was performed on a Dynamic Mechanical Analyzer (DMA Q800, TA Instruments Corp., New Castle, DE) with a strain sweep (0-15%) and load 0.01

N at 1 Hz frequency for various ratio patterns of PEG/methylcellulose and GelMA (FIG. 8, Panel A). Three difference print ratios (PEG:GelMA) were utilized to fabricate the hybrid nipple-areola scaffolds with methylcellulose thickened PEG; 1-1 ratio; 1-2 ratio; and 1-3 ratio. Animal tissue (pig teat) was used as a control (FIG. 8, Panel B). As shown by the data, the methylcellulose thickener aided in achieving mechanical properties comparable to those exhibited in vivo.

Figure 9:
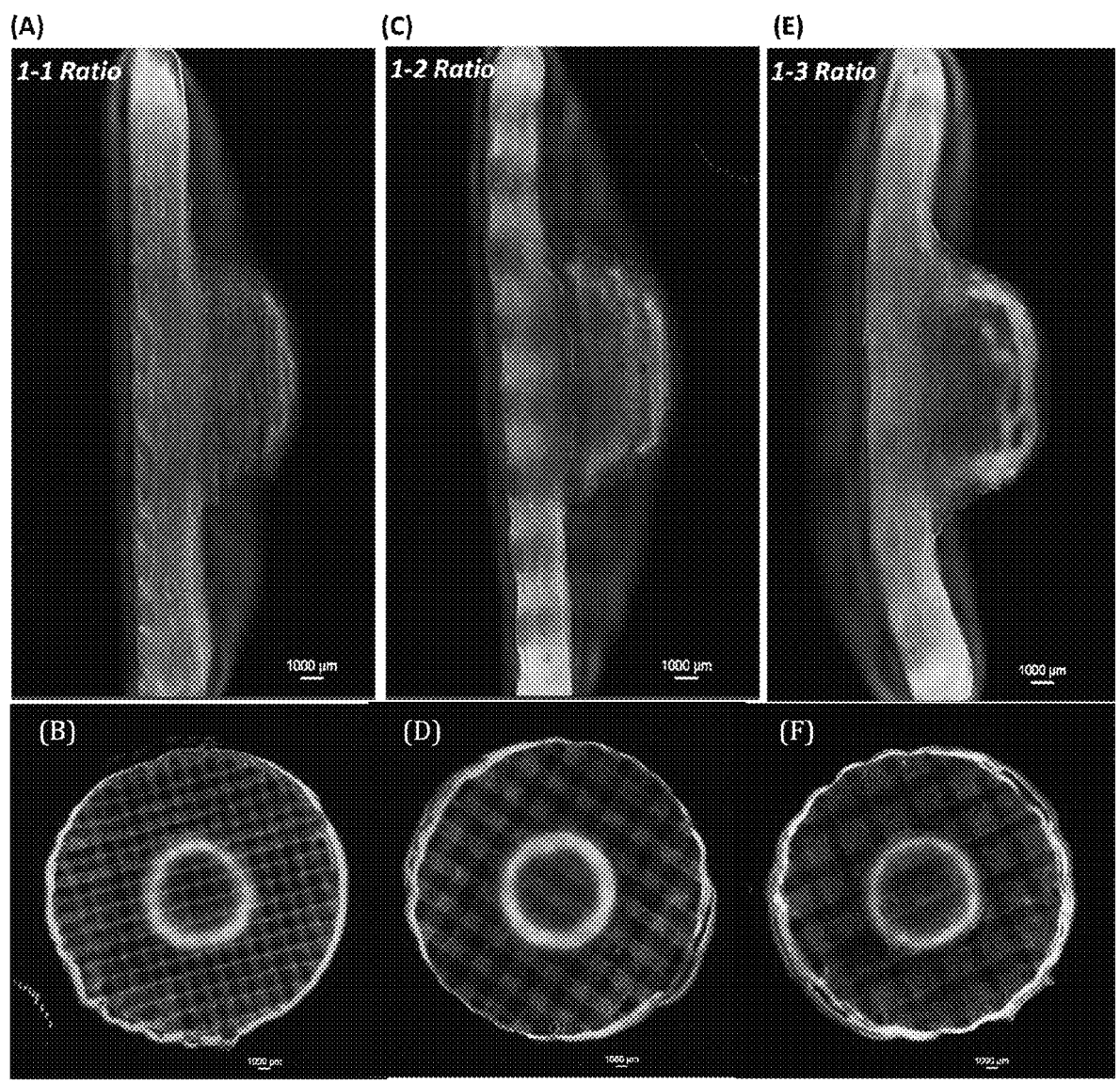
FIG. 9. Hybrid scaffolds of nipple-areola complex formed from PEG/methylcellulose and GelMA bioink. Live/Dead images were taken after 14 days (calcein AM: green cells=live). Fibroblasts in all print patterns including 1-1 ratio (Panels A-B), 1-2 ratio (Panels C-D), and 1-3 ratio (Panels E-F) were viable post 14 days in culture under submerged media conditions, allowing fibroblasts to survive throughout the large nipple-areola graft.

The average physiological shape of a female human nipple-areola complex, and thus the implant, is relatively large, including an average nipple projection height of ~8 mm, a nipple projection diameter of ~9 mm, and an areola projection diameter of ~30 mm. Diffusion through the hybrid scaffold should therefore occur such that the core of the projection is completely penetrated with media. All print patterns (1-1 ratio, 1-2 ratio, and 1-3 ratio) were viable post 14 days in culture under submerged media conditions, allowing fibroblasts to survive and flourish throughout the large nipple-areola graft (FIG. 9, Panels A-F).

Figure 10:
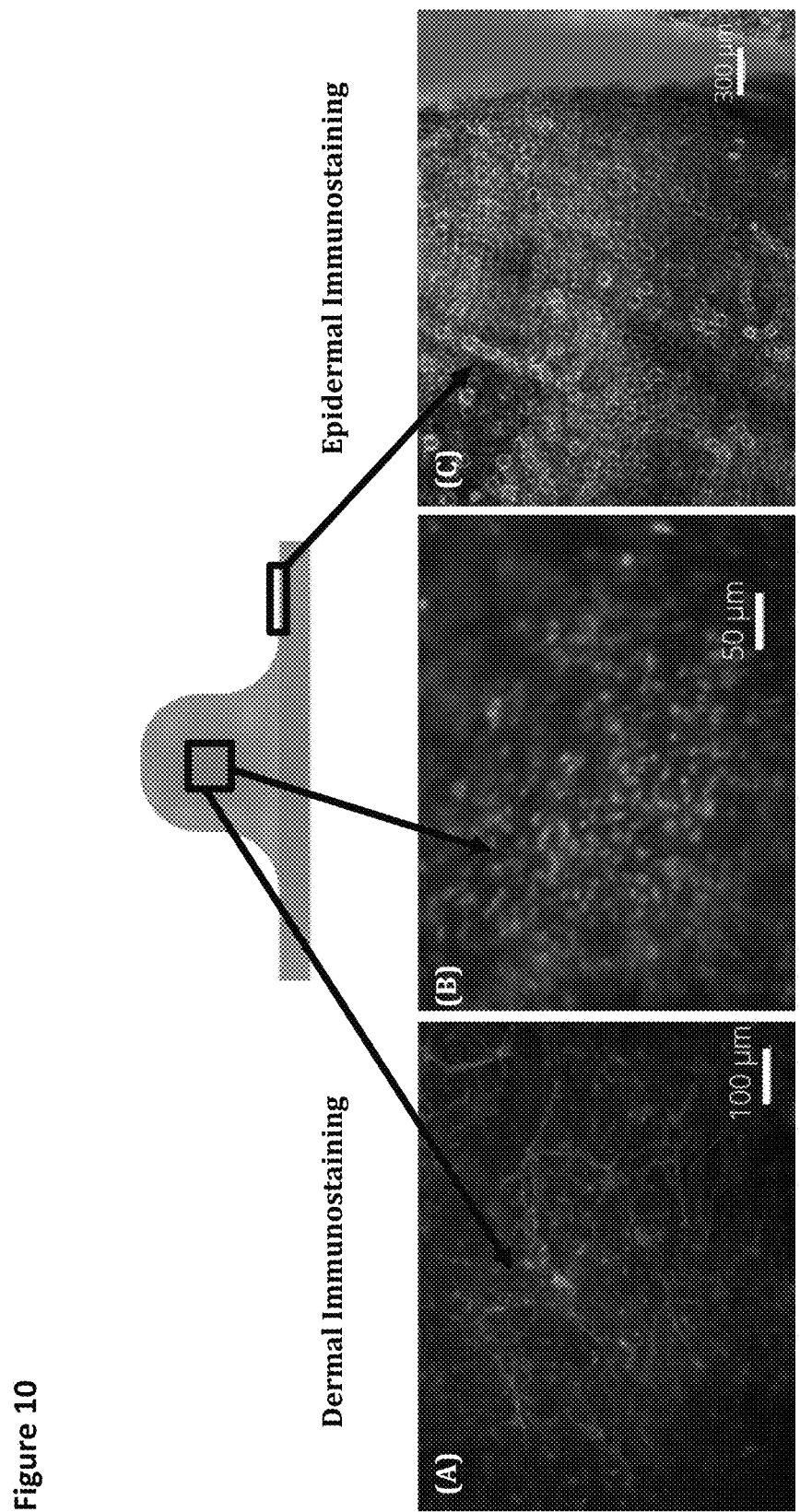
FIG. 10. Dermal and Epidermal Immunostaining. Fabricated nipple-areola scaffolds demonstrated skin formation in vitro. (Panel A) Phalloidin (red) actin (cytoskeleton) stain of fibroblasts; DAPI (blue) nuclei stain of fibroblasts. (Panel B) Collagen I (red) stain of protein excreted by fibroblasts; DAPA (blue) nuclei stain of fibroblasts. (Panel C) Cytokeratin 14 (green) protein (cytoskeleton) stain of keratinocytes; DAPI (blue) nuclei stain of fibroblasts. Visual functional dermis was developed in printed scaffolds with fibroblasts exhibiting a healthy, spindle-like morphology and collagen I development. Epidermal growth was shown to develop through positive cytokeratin 10 expression (cytoskeletal protein produced in primary human epidermal keratinocyte cells) in the printed scaffolds.

Hybrid PEG and GelMA nipple-areola scaffolds fabricated in accordance with disclosed techniques demonstrated excellent skin formation in vitro (FIG. 10). As demonstrated by dermal immunostaining, visual functional dermis was developed in printed scaffolds with fibroblasts exhibiting a healthy, spindle-like morphology (FIG. 10, Panel A) and collagen I development (FIG. 10, Panel B). As demonstrated by epidermal immunostaining, epidermal growth was shown to develop through positive cytokeratin 10 expression (cytoskeletal protein produced in primary human epidermal keratinocyte cells) in the hybrid printed scaffolds (FIG. 10, Panel C).

To better integrate the implant with surrounding patient tissue, primary cells from the patient are biopsied, expanded in vitro, and incorporated into the scaffold in a fashion that mimics autologous skin grafts. Primary human dermal fibroblasts are encompassed and printed within the GelMA bioink solution. Primary keratinocytes (KCs) may also be included in the bioink solution. The construct is cultured for a sufficient period of time (e.g., 14 days) in vitro at an appropriate air-liquid media interface in order to promote proper differentiation of KCs, thereby providing a functional human skin graft. Post incubation, the skin graft may be sutured directly onto the patient's breast.

Figure 11:
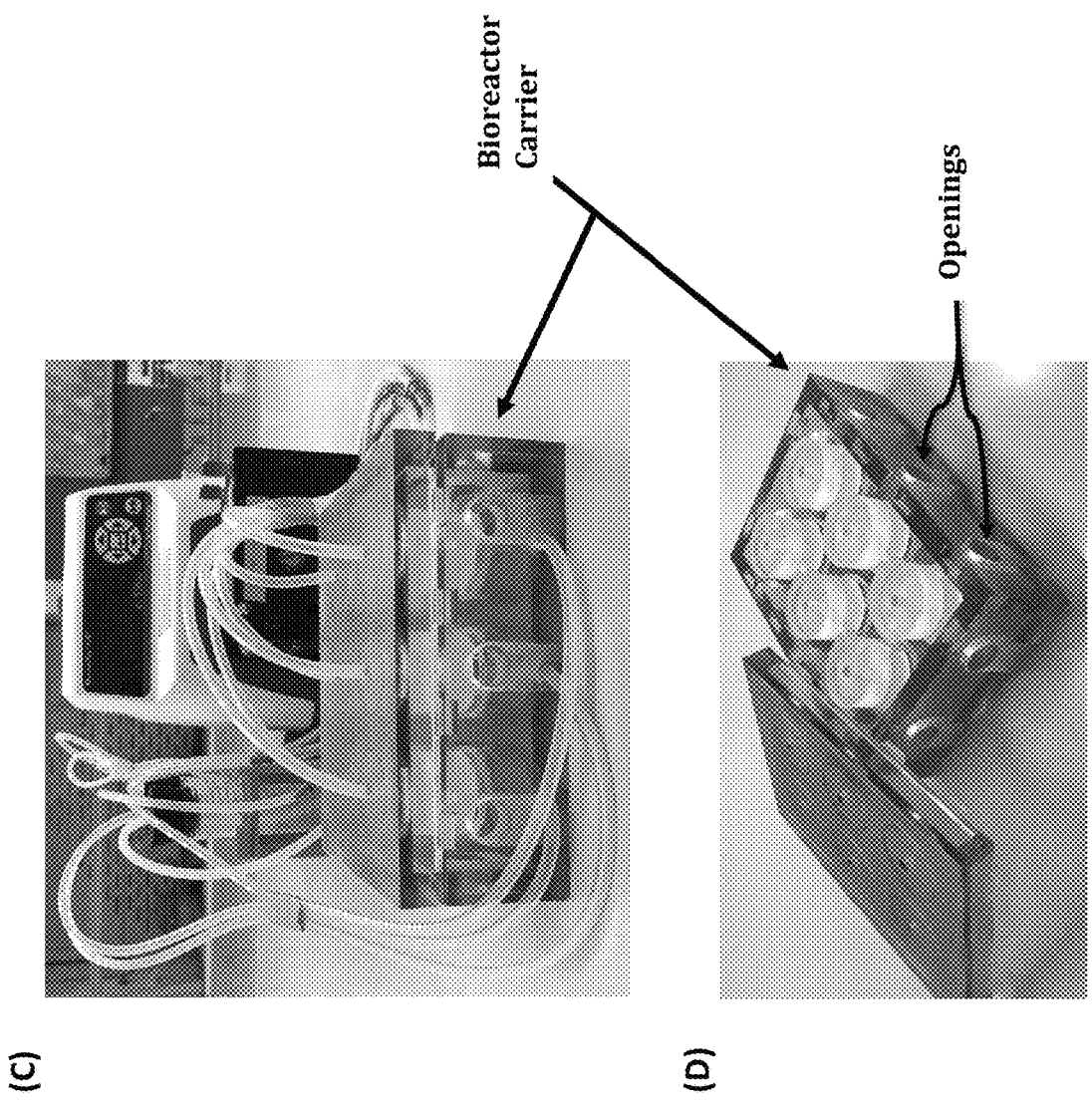
FIG. 11. Bioreactor for Skin Graft Development. (Panel A) Exemplary bioreactor set up provides an air-liquid interface for skin maturation while the scaffold is retained in an inverted orientation. (Panel B) The bioreactor includes useful detachable components for scaffold loading. (Panels C-D) A bioreactor carrier for organizing and housing a plurality of bioreactors is preferably provided, e.g., that houses six bioreactors simultaneously and aids in organizing the tubing connected to an operably associated external pump.

Specialty Bioreactor for Skin Graft Development:

A specialized bioreactor was designed for optimization of cell growth within the scaffold, which provides an air-liquid interface for skin maturation while the scaffold is retained in an inverted orientation (FIG. 11, Panel A). In a preferred implementation, a single bioreactor includes useful detachable components for scaffold loading. Referring to FIG. 11, Panel B, media is supplied to the bioreactor via an upper media inlet. From the media inlet, the media flows into an upper supply chamber and showers the backend of the scaffold areola portion when disposed in the reactor (through openings in the supply chamber base). The scaffold is retained below the upper supply chamber (and above a bottom chamber) via a scaffold areola clip. Media continues to flow through the scaffold and exits at the nipple projection and into a lower collection area or bottom chamber. A surface tension tip is provided in the bottom chamber, which engages the distal end of the nipple and aids in directing the media flow through the nipple projection and into the lower chamber. Media then exits through a pressurized media outlet and may be recirculated/recycled.

A bioreactor carrier for organizing and housing a plurality of bioreactors is also preferably provided. Referring to FIG. 11, Panels C-D, a bioreactor carrier is provided that houses six bioreactors simultaneously and aids in organizing the tubing connected to an operably associated external pump. Circular cavities or openings located on the bioreactor carrier sides provide sufficient air exposure to the scaffold surface. The open design of the bioreactor allows sufficient air flow and exposure to the top of the skin graft (FIG. 11, Panel A), thereby enhancing epidermal keratinocyte stratification (skin barrier development).

Growing the skin cells of the scaffold in an inverted manner allows gravity to efficiently pull media throughout the construct while in the bioreactor, and results in enhanced nutrient diffusion throughout the scaffold and in particular through the nipple projection area. This facilitates the growth and maintenance of a viable dermis in the scaffold, and provides the proliferating epidermal base to continually grow and stratify in vitro. To verify the advantages of the disclosed bioreactor configuration, media transfusion experiments were conducted comparing the resulting nipple graft cultured in an inverted orientation compared to culturing the graft with the nipple projection extending upwardly. Media was much more evenly distributed using the bioreactor configuration of the present disclosure (wherein the scaffold is inverted in the bioreactor) as compared to a conventional culturing setup. Using the inverted bioreactor set up, the graft and nipple projection retained its shape and exhibited enhanced cell growth (FIG. 12, Panel A); in comparison, grafts cultured with the nipple projection extending upwardly resulted in a dehydrated nipple projection (FIG. 12, Panel B), indicating inadequate media diffusion for skin graft maturation.

Figure 14:
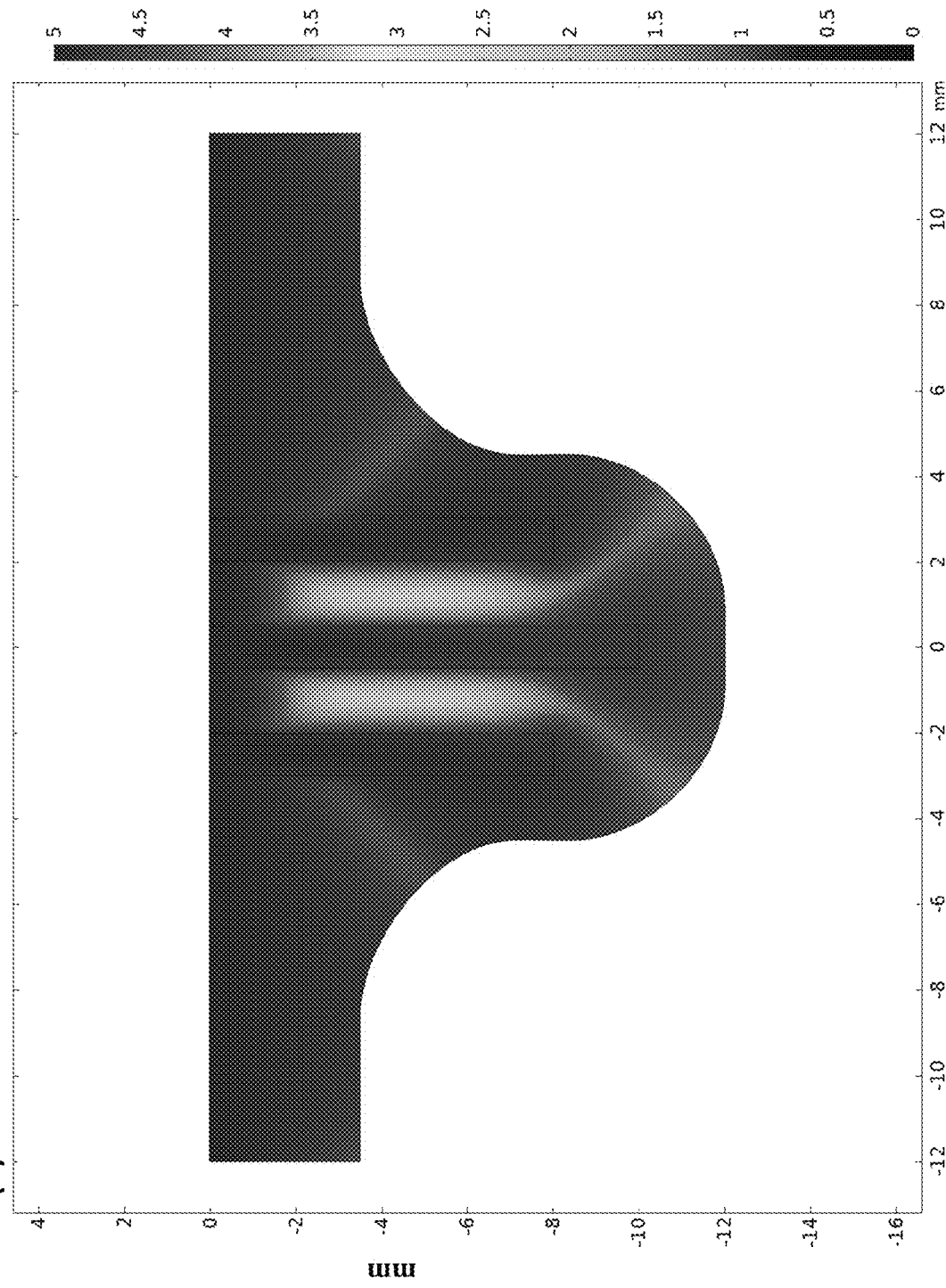
FIG. 14. Glucose concentration mapping (COMSOL® software). Vascular channels were shown to increase diffusion time of glucose and oxygen in the nipple projection area of the scaffold during in vitro incubation and thus enhance skin graft development, as compared to glucose diffusion in a control scaffold with no vascular channels. (Panel A) High glucose concentration levels are shown (red and yellow coloration) throughout entire scaffold having vascular channels including entire nipple projection area. (Panel B) Low or no glucose concentration levels are shown (blue) in scaffold lacking vascular channels.
Figure 14:
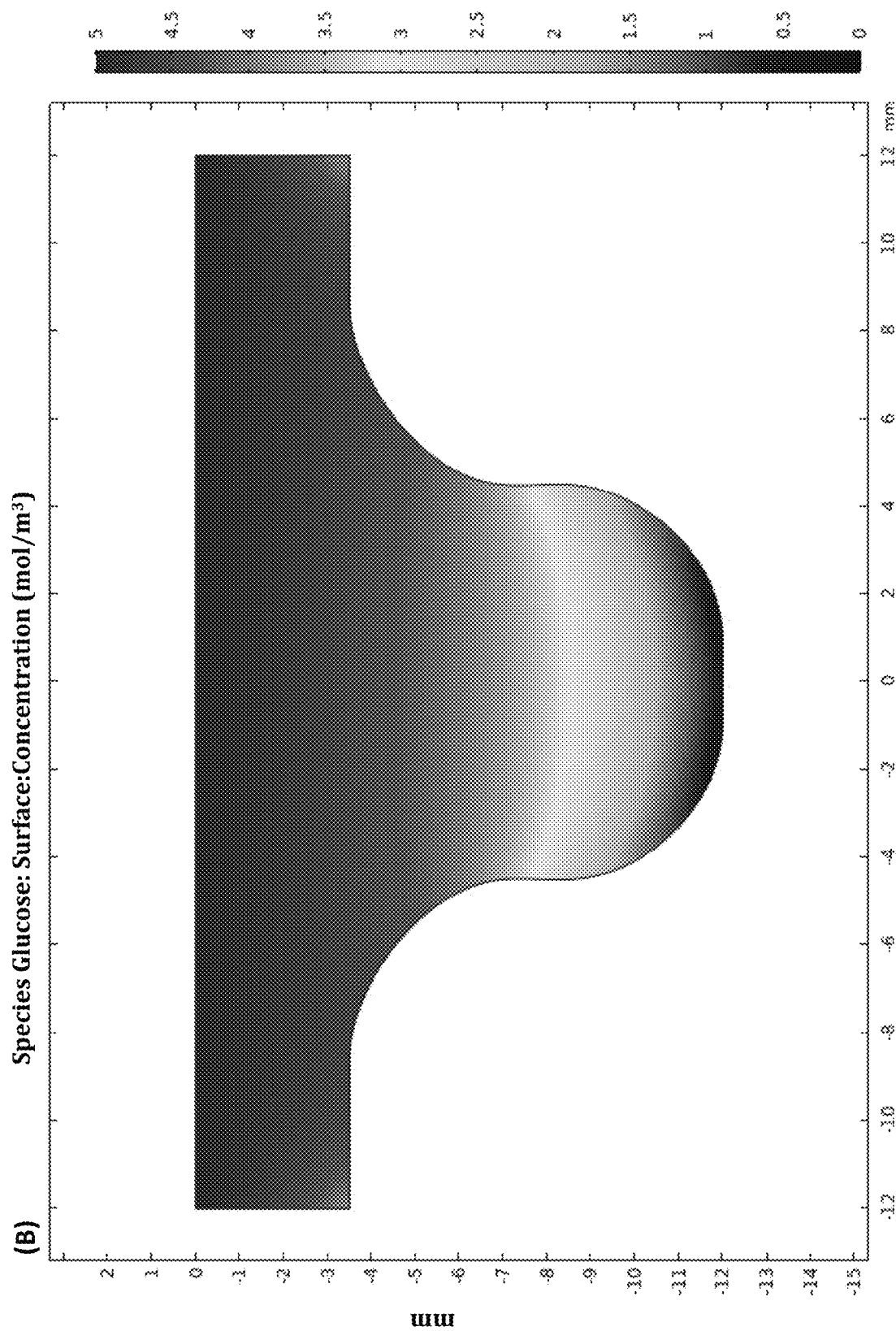

Additional investigations were conducted to determine whether the complex curvature of the scaffold adversely impacts the development of a stratified epidermal layer. Neovascularization of tissue-engineered skin proceeds more slowly than in split-thickness skin autografts (the gold standard for burn wound treatment) due to the absence of a vascular network. This can contribute to graft failure by increasing the amount of time that grafted cells are deprived of nutrients. To address this issue and aid in media diffusion and graft viability, open vascular channels were fabricated during the 3D printing process in various architectures using sacrificial materials throughout the interior of the scaffold (FIG. 13). Diffusion of the media through the graft when placed in the bioreactor may be modeled, e.g., using COMSOL software (Comsol, Inc., Stockholm, Sweden). Vascular channels were shown to increase diffusion time of glucose and oxygen in the nipple projection area of the scaffold during in vitro incubation (FIG. 14, Panel A) and thus enhance skin graft development, as compared to glucose diffusion in a control scaffold with no vascular channels (FIG. 14, Panel B). Epidermal keratinocytes were stratified and vascularization was stimulated throughout the disclosed nipple-areola skin grafts by maturing the implants prior to implantation in the disclosed bioreactor system and via the incorporation of the sacrificial vascular channels. The vascular channels also aid in neovascularization in vivo after scaffold implantation in a subject.

Figure 15:
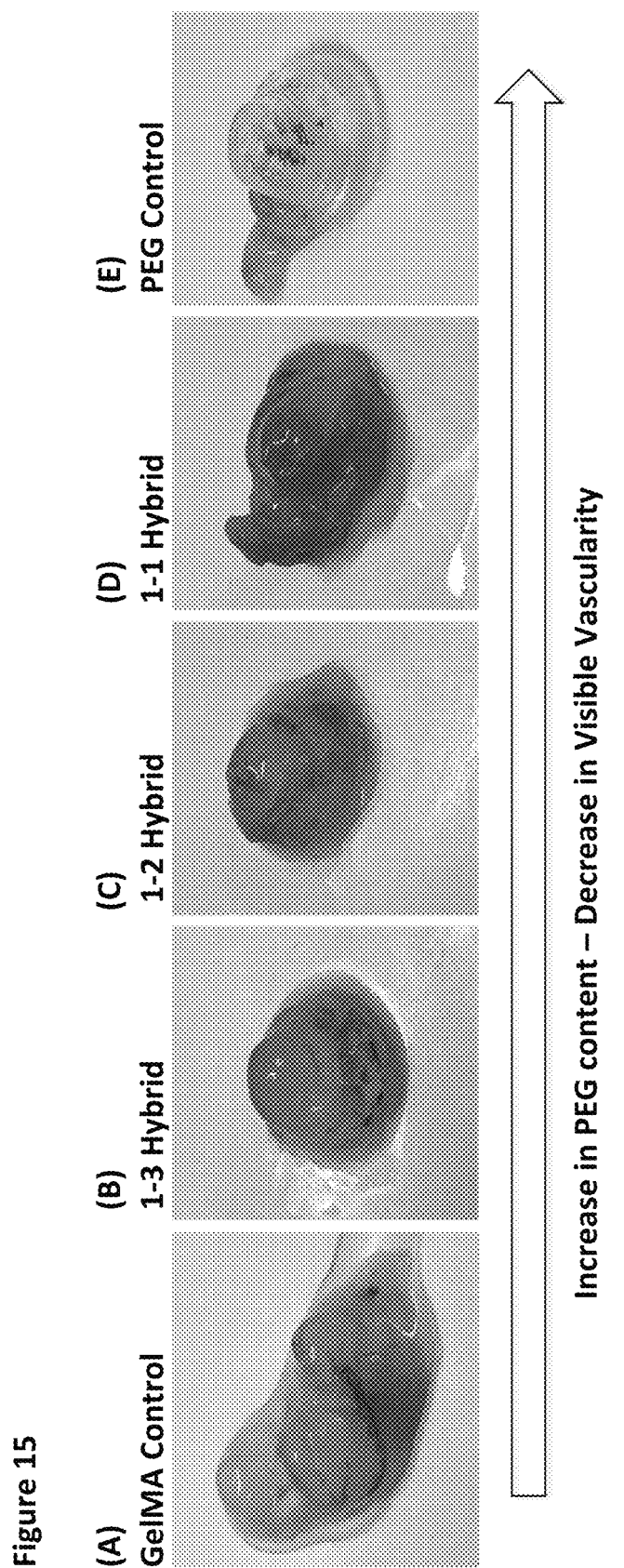
FIG. 15. Images of various implant patterns resected from animal model (female Lewis rats) including: A) GelMA control; B) 1-3 hybrid; C) 1-2 hybrid; D) 1-1 hybrid; and E) PEG control. All implants were inserted beneath the fascia region within the subcutaneous pocket (n=5 per implant type) and tacked down with absorbable sutures to minimize scaffold movement. Animals were closely monitored throughout a 4-week study period. Animals were later sacrificed and implant and surrounding tissue resected, sectioned, and stained for histological analysis.

In Vivo Implantation:

In vivo stability of the implant was determined via subcutaneous implantation within an animal model (female Lewis rats). All printed patterns (1-3 ratio; 1-2 ratio; 1-1 ratio) were tested, as well as controls of solely GelMA and solely PEG. 3 implants per rat were inserted beneath the fascia region within the subcutaneous pocket (n=5 per implant type: PEG control, 1-1 pattern, 1-2 pattern, 1-3 pattern, GelMA control). Each implant was tacked down with absorbable sutures to minimize scaffold movement. Animals were closely monitored throughout the 4-week study. Animals were later sacrificed and implant and surrounding tissue were resected, sectioned, and stained for histological analysis. The data demonstrated a decrease in visible vascularity as PEG content increased (FIG. 15, Panels A-E).

Figure 16:
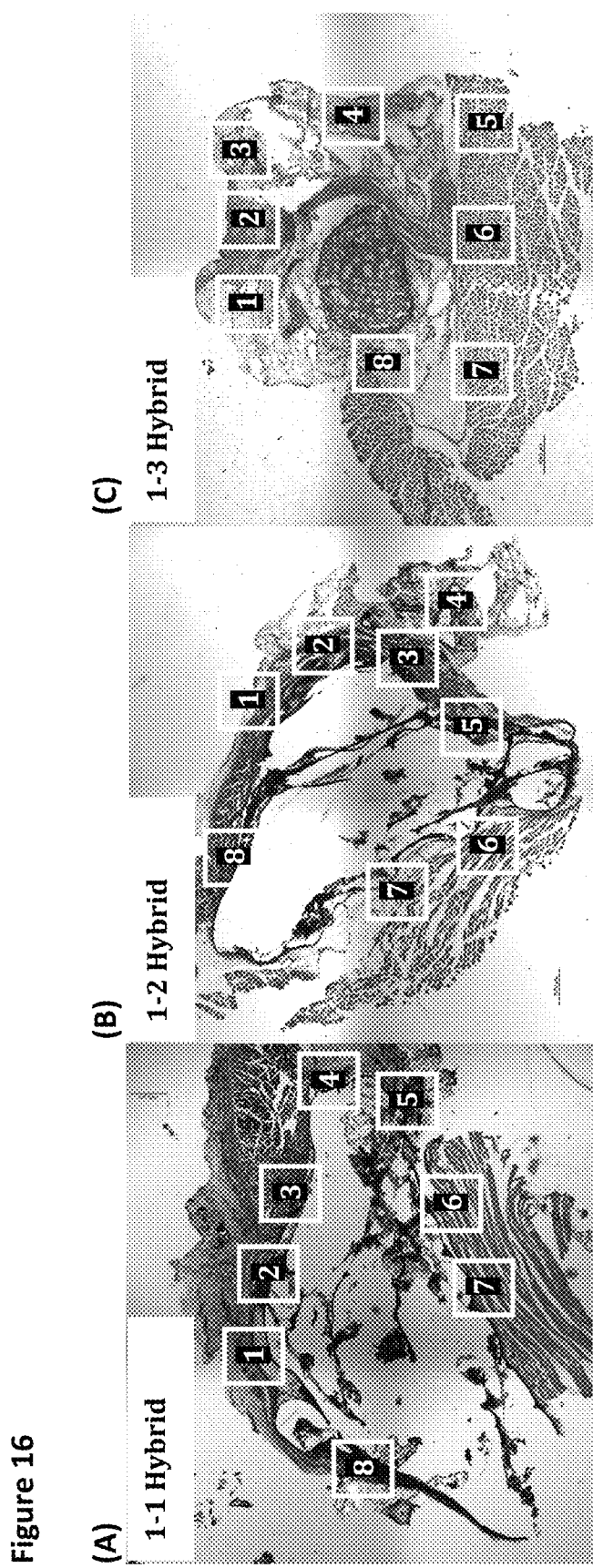
FIG. 16. Hematoxylin & Eosin staining was performed on 15 μm sectioned resected tissue. 2× images show the entire implant and ~2 mm surrounding tissue ingrowth for 1-1 hybrid (Panel A), 1-2 hybrid (Panel B) and 1-3 hybrid (Panel C).
Figure 17:
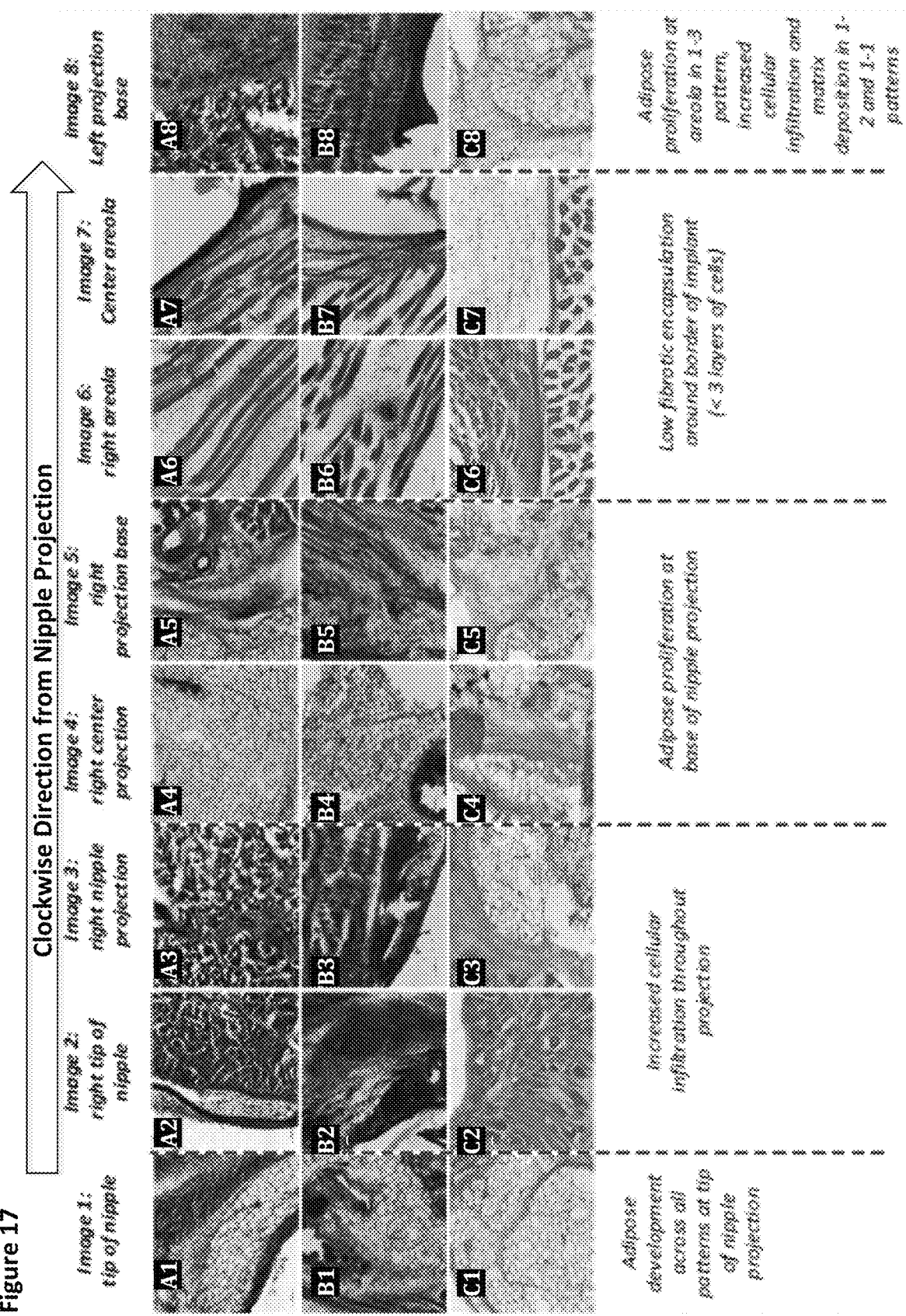
FIG. 17. Hematoxylin & Eosin staining. 20× images of boxed areas (1-8) for 1-1 hybrid (Panels A1-A8), 1-2 hybrid (Panels B1-B8) and 1-3 hybrid (Panels C1-C8) showing cellular infiltration throughout each of the constructs, low fibrotic encapsulation, and adipose proliferation.

Hematoxylin & Eosin staining was performed on 15 µm sectioned resected tissue. 2× images (FIG. 16, Panels A-C) show the entire implant and ~2 mm surrounding tissue ingrowth for 1-1 hybrid (FIG. 16, Panel A), 1-2 hybrid (FIG. 16, Panel B) and 1-3 hybrid (FIG. 16, Panel C). Further 20× images of areas identified in numbered boxes (1-8 in FIG. 15) were evaluated for 1-1 hybrid (FIG. 17, Panels A1-A8), 1-2 hybrid (FIG. 17, Panels B1-B8) and 1-3 hybrid (FIG. 17, Panels C1-C8) show cellular infiltration throughout each of the constructs, low fibrotic encapsulation, and adipose proliferation.

Mechanical Properties and Tunability:

As demonstrated by the data herein, the synthetic PEG ink is capable of both displaying soft tissue mechanical properties as well as supporting and retaining scaffold shape when co-printed with the degradable GelMA bioink. As discussed above, different print patters of the two inks were tested to quantify both mechanical properties and shape maintenance of the scaffolds (FIG. 3, Panel A). For testing each of the patterns, strands of the materials were alternated (at 0° and 90°) in a crosshatch pattern (FIG. 1, Panel B, showing 1-1 ratio printing pattern of PEG-GelMA). Uniaxial compression testing was performed on the hybrid scaffolds both before and after experiencing GelMA digestion via collagenase IV (FIG. 3, Panels B-D). Mechanical characterization displayed that the PEG/alginate ink increased the mechanical strength of the hybrid prints.

Characteristics of the printed scaffold are readily tunable by altering the PEG:GelMA ratio in the print ratio pattern. A vast range of mechanical properties can be obtained, governed by the print pattern utilized during scaffold fabrication. This allows for the ability to adapt and utilize the scaffold for various soft tissue compositions. Mechanical properties of various print pattern scaffolds were characterized before and after exposure to collagenase IV (500 Units $mL^{-1}$) overnight. Results are presented in Table 1 below:

TABLE 1

| Stiffness (kPa) of Printed Scaffold Pattern Ratios (PEG:GelMA) pre- and post-digested by collagenase IV. | | | | |
|---|---|---|---|---|
| 1-0 Ratio | 2-1 Ratio | 1-1 Ratio | 1-2 Ratio | 1-3 Ratio |
| Pre-digested 430 ± 28 kPa | 264 ± 28 kPa | 190 ± 18 kPa | 164 ± 22 kPa | 100 ± 12 kPa |
| Post-digested 420 ± 22 kPA | 230 ± 25 kPa | 100 ± 15 kPa | 45 ± 5 kPa | 32 ± 6 kPa |

Thus, mechanical properties may be readily selected to be comparable with properties of a particular tissue, e.g., tendons/ligaments (500 kPa), skeletal muscle (100 kPa), skin (50 kPa), blood vessels (20 kPa) and adipose fat (10 kPa).

Visual scaffold dimensions were recorded and compared to its original fabricated form, specifically width, length, and peak height. Magnitude of curvature was also calculated and recorded for each hybrid pattern (FIG. 4, Panels C-D). Cytotoxicity of the ink formulation was tested and percent live cells and DNA concentrations were quantified as described above (FIG. 6, Panels E-F).

Additional Therapeutic Agents:

As the skin graft grows in vitro, the biodegradable epidermal barrier or compartment may be added. In one implementation, the epidermal compartment includes hand seeded epidermal keratinocyte cells, thereby completing the skin graft implant. (Generally, keratinocytes do not perform well when suspended in hydrogel, and therefore keratinocytes were hand-seeded to the surface of the scaffold to ensure proper attachment and stratification thereof).

The epidermal compartment may additionally comprise one or more therapeutic agents, e.g., such as an antibiotic. In some implementations, poly(lactic-co-glycolic acid) (PLGA) microparticles loaded with an antibiotic agent are incorporated into the epidermal compartment, allowing for localized release of antibiotics for combating infection (a common problem in reconstructive surgery). The polymeric composition coating of the microparticles may be tailored to allow for sustained release of the antibiotic over a clinically relevant time frame (e.g., 1-3 months). Thus, the epidermal compartment may be engineered to both release an antibiotic agent to the local tissue and aid in the incorporation of the scaffold.

Concluding Remarks

A 3D printing strategy for fabricating biomimetic soft tissue grafts via simultaneous 3D printing of biodegradable and non-biodegradable hydrogel materials is provided. Implantable scaffold devices fabricated in accordance with disclosed methods comprise sacrificial layers or degradable portions that allow for tissue integration, and a skeletal network or support portions that maintain mechanical properties and shape integrity in vivo. The versatile and cell-friendly 3D printing platform and revolutionary application of mesh analysis for assessing scaffold aesthetic properties substantially enhances soft tissue engineering techniques. The disclosed strategies were successfully applied to commonly used hydrogels, such as GelMA, PEG-based, and thickening materials (e.g., alginate, methylcellulose) utilizing a process of multimaterial printing that can be readily accessed by the 3D printing and biomedical community. DN-GelMA printing patterns used to fabricate complex scaffold devices highly dictate both mechanical properties of the device and its ability to maintain shape post degradation processes. Cytotoxicity characterization of the hybrid print scaffold devices revealed high proliferation and cell spreading after multiple weeks of in vitro culture.

Biomimetic hydrogel grafts composed of both biodegradable and non-biodegradable portions were produced, which harmoniously coexist to promote tissue integration while maintaining their original printed structure. Prior methodologies (including both single and multi-material printing methods) have failed to produce such volume-stable, mechanically relevant, biocompatible soft tissue grafts exhibiting the characteristics of the devices disclosed herein. The present disclosure thus provides for modular and biocompatible ink formulations and implants formed therefrom suitable for use in treating various soft tissue defects. The disclosed scaffold devices are capable of integrating with the surrounding environment and providing long term mechanical integrity and shape retention. For example, the disclosed nipple-areola implant device provides not only a long-term prosthetic solution for dermal tissue regeneration, but also enables the controlled delivery of antibiotics or other therapeutic agents in order to minimize the possibility of and/or combat infection directly at the site of implantation.

All identified publications and references mentioned in this specification are herein incorporated by reference to the same extent as if each individual publication was specifically and individually indicated to be incorporated by reference in its entirety. While the invention has been described in connection with exemplary embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the features hereinbefore set forth.

What is claimed is:

1. A 3D-printed implantable scaffold device, said device comprising:
   a. a non-biodegradable polymer portion layer; and
   b. a biodegradable cell-laden bioink hydrogel portion layer;
   wherein said non-biodegradable polymer portion layer forms a three-dimensional matrix comprising voids; and
   wherein said biodegradable cell-laden bioink hydrogel portion layer is disposed over the surface of said non-biodegradable polymer portion layer; and
   wherein said biodegradable cell-laden bioink hydrogel portion layer is infilled within said voids of said non-biodegradable polymer portion layer matrix.

2. The device of claim 1, wherein said device further comprises a thickener, and wherein said non-biodegradable polymer portion layer and said thickener are arranged in a double network (DN).

3. The device of claim 1, wherein said non-biodegradable polymer portion layer is chosen from poly(ethylene)glycol, poly(N-isopropylacrylamide), poly(vinyl alcohol), a poly(acrylate), or combinations thereof.

4. The device of claim 1, wherein said non-biodegradable polymer portion layer is poly(ethylene glycol) or poly(acrylate).

5. The device of claim 1, wherein said biodegradable cell-laden bioink hydrogel portion layer comprises collagen, gelatin, gelatin derivative, silk fibroin, fibrin, elastin, chitosan, hyaluronic acid, or alginate, and combinations thereof.

6. The device of claim 1, wherein said gelatin derivative portion is gelatin methacrylate.

7. The scaffold device of claim 1, wherein said biodegradable cell-laden bioink hydrogel portion comprises cells of a subject.

8. The scaffold device of claim 7, wherein said cells are autologous cells of a subject.

9. The scaffold device of claim 7, wherein said cells comprise a population of fibroblasts and/or a population of keratinocytes.

10. The scaffold device of claim 1, wherein said device a ratio of said non-biodegradable polymer portion layer and said biodegradable cell-laden bioink hydrogel portion layer in the range of 1:0.5 to 1:3.

11. The scaffold device of claim 1, wherein said device comprises a ratio of said non-biodegradable polymer portion layer and said biodegradable cell-laden bioink hydrogel portion layer of about 1:1.

12. The scaffold device of claim 2, wherein said thickener is alginate or methylcellulose.

13. The device of claim 2, wherein said non-biodegradable polymer portion layer and said thickener are covalently linked arranged within said double network.

14. The device of claim 1, wherein said device is a nipple-areola complex implant, nose implant, ear implant, or thyroid cartilage implant.

15. A method of 3D printing an implantable scaffold device, comprising the step of coprinting a non-biodegradable polymer portion layer using a synthetic ink formulation and a biodegradable cell-laden bioink hydrogel portion layer using a biodegradable bioink formulation to obtain said device;
   said device comprising:
      a. a non-biodegradable polymer portion layer; and
      b. a biodegradable cell-laden bioink hydrogel portion layer;
   wherein said non-biodegradable polymer portion layer forms a three-dimensional matrix comprising voids; and
   wherein said biodegradable cell-laden bioink hydrogel portion layer is disposed over the surface of said non-biodegradable polymer portion layer; and
   wherein said biodegradable cell-laden bioink hydrogel portion layer is infilled within said voids of said non-biodegradable polymer portion layer matrix.

16. The method of claim 15, wherein said synthetic ink formulation comprises a polymer material selected from the group consisting of a polyether, a polyacrylamide, a polyvinyl, a polyacrylate, and mixtures thereof.

17. The method of claim 15, wherein said biodegradable bioink formulation comprises a biopolymer selected from the group consisting of collagen, gelatin, gelatin derivative, silk fibroin, fibrin, elastin, chitosan, hyaluronic acid, and alginate.

18. The method of claim 15, wherein said synthetic ink formulation comprises a thickener.

19. The method of claim 15, wherein said biodegradable bioink formulation comprises a population of fibroblasts and/or a population of keratinocytes.

20. The method of claim 15, wherein said implantable scaffold device is configured as a nipple-areola complex.

* * * * *